United States Patent
Zhang et al.

(10) Patent No.: US 11,997,522 B2
(45) Date of Patent: May 28, 2024

(54) USER EQUIPMENT BEAM MEASUREMENTS TO MITIGATE CROSS-LINK INTERFERENCE

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Fairless Hills, PA (US); Tao Luo, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 17/456,354

(22) Filed: Nov. 23, 2021

(65) Prior Publication Data
US 2023/0163868 A1 May 25, 2023

(51) Int. Cl.
*H04B 7/06* (2006.01)
*H04B 17/24* (2015.01)
(Continued)

(52) U.S. Cl.
CPC ........ *H04W 24/10* (2013.01); *H04B 7/06954* (2023.05); *H04B 7/06968* (2023.05); *H04B 17/24* (2015.01); *H04B 17/345* (2015.01); *H04W 16/28* (2013.01); *H04W 36/20* (2013.01); *H04W 52/243* (2013.01);
(Continued)

(58) Field of Classification Search
CPC ... H04B 7/02–12; H04B 17/0082–3913; H04J 11/0023–0093; H04J 2011/0003–0096; H04L 5/0001–0098; H04W 8/18–245; H04W 16/02–28; H04W 24/02–10; H04W 28/02–26; H04W 36/0005–385; H04W 40/02–32; H04W 48/02–20; H04W 52/04–60; H04W 56/001–0025; H04W 72/02–569; H04W 74/002–0891; H04W 84/02–16; H04W 88/02–12; H04W 92/02–24
See application file for complete search history.

(56) References Cited

U.S. PATENT DOCUMENTS

2020/0344614 A1* 10/2020 Takano ................ H04W 24/10
2020/0389805 A1* 12/2020 Kim ...................... H04W 24/10
(Continued)

OTHER PUBLICATIONS

International Search Report and Written Opinion—PCT/US2022/049986—ISA/EPO—dated Feb. 22, 2023.

*Primary Examiner* — Timothy J Weidner
(74) *Attorney, Agent, or Firm* — Loza & Loza, LLP

(57) ABSTRACT

An apparatus (e.g., a user equipment (UE)) may experience cross-link interference from uplink signal beams from interfering UEs. To mitigate the cross-link interference, the apparatus receives an interference resource information message indicating resources allocated to one or more interfering UEs for transmission of reference signal beams, measures the reference signal beams from the one or more interfering UEs based on the resources to obtain a plurality of reference signal beam measurements; and transmits a report indicating a set of the reference signal beams from the one or more interfering UEs based on the plurality of reference signal beam measurements.

29 Claims, 19 Drawing Sheets

(51) Int. Cl.
  *H04B 17/345* (2015.01)
  *H04W 16/28* (2009.01)
  *H04W 24/10* (2009.01)
  *H04W 36/20* (2009.01)
  *H04W 52/24* (2009.01)
  *H04W 72/044* (2023.01)
  *H04W 84/02* (2009.01)
  *H04W 88/02* (2009.01)
  *H04W 88/08* (2009.01)
  *H04W 92/02* (2009.01)
  *H04W 92/10* (2009.01)
  *H04W 92/18* (2009.01)
  *H04W 92/20* (2009.01)

(52) U.S. Cl.
  CPC .......... *H04W 72/046* (2013.01); *H04W 84/02* (2013.01); *H04W 88/02* (2013.01); *H04W 88/08* (2013.01); *H04W 92/02* (2013.01); *H04W 92/10* (2013.01); *H04W 92/18* (2013.01); *H04W 92/20* (2013.01)

(56) References Cited

U.S. PATENT DOCUMENTS

| | | |
|---|---|---|
| 2021/0084655 A1 | 3/2021 | Estevez et al. |
| 2021/0328692 A1 | 10/2021 | Zhang et al. |
| 2022/0116129 A1* | 4/2022 | Ying .................... H04W 24/10 |
| 2022/0124515 A1* | 4/2022 | Castaneda ............. H04W 24/10 |

* cited by examiner

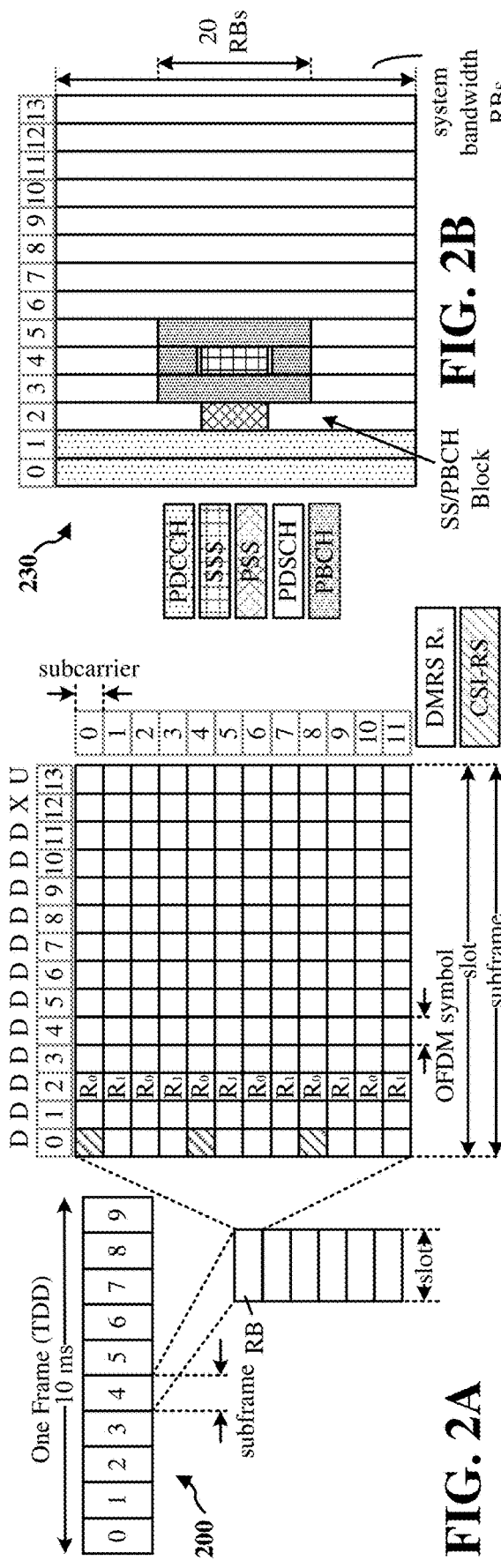
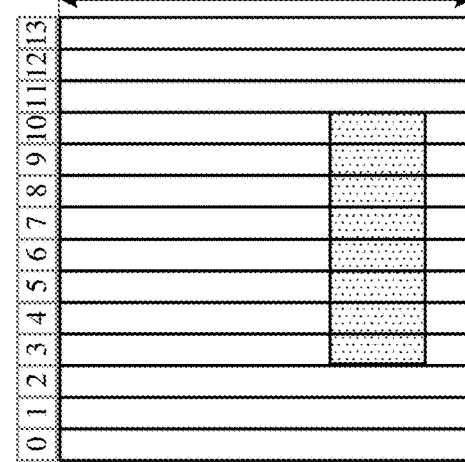
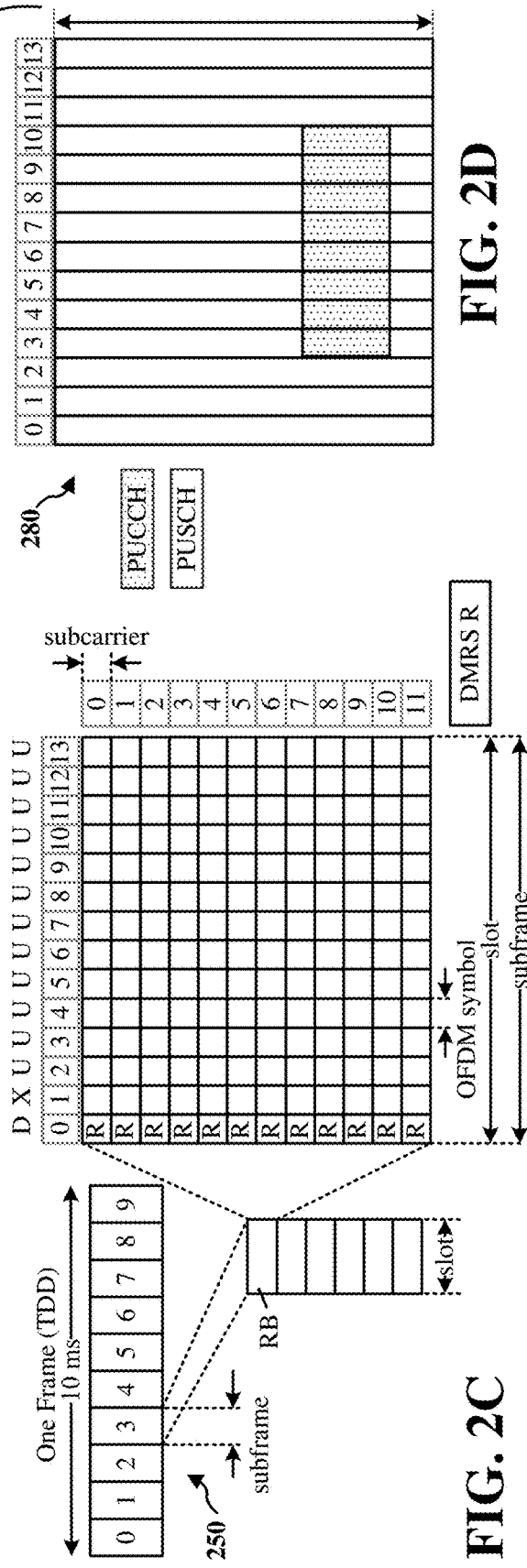
FIG. 2A
FIG. 2B
FIG. 2C
FIG. 2D

USER EQUIPMENT BEAM MEASUREMENTS TO MITIGATE CROSS-LINK INTERFERENCE

BACKGROUND

Technical Field

The present disclosure relates generally to communication systems, and more particularly, to inter-user equipment (UE) beam measurements to mitigate cross-link interference (CLI).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A base station may operate in a full-duplex mode to concurrently serve multiple user equipments (UEs) in a cell. For example, in the full-duplex mode, the base station may transmit a downlink signal to a first UE in the cell while receiving an uplink signal from a second UE in the cell. In some scenarios, when the second UE transmits an uplink signal to the base station, the uplink signal transmission may cause interference to the first UE attempting to receive a downlink signal from the base station. In other scenarios, a third UE in a neighboring cell may transmit an uplink signal to a neighboring base station. The uplink signal from the third UE may arrive at the first UE and may cause interference to the first UE when attempting to receive a downlink signal from the base station. These types of interference may be referred to as cross-link interference (CLI).

In some wireless communication networks (e.g., 5G NR networks), a UE may use a certain transmit beam to transmit a beamformed uplink signal (e.g., a beamformed reference signal, such as a sounding reference signal (SRS)) to a base station and may use a certain receive beam to receive a beamformed downlink signal from the base station. The aspects described herein allow a victim UE (e.g., a UE experiencing cross-link interference) to measure and identify one or more uplink signal beams of an aggressor UE (e.g., a UE causing cross-link interference) for purposes of mitigating cross-link interference.

In an aspect of the disclosure, a method, a computer-readable medium, and an apparatus are provided. The apparatus receives an interference resource information message indicating resources allocated to one or more interfering UEs for transmission of reference signal beams and measures the reference signal beams from the one or more interfering UEs based on the resources to obtain a plurality of reference signal beam measurements. The apparatus transmits a report indicating a set of the reference signal beams from the one or more interfering UEs based on the plurality of reference signal beam measurements.

In an aspect of the disclosure, a method, a computer-readable medium, and an apparatus are provided. The apparatus transmits an interference resource information message to at least one UE of the one or more UEs, wherein the interference resource information message indicates resources allocated to one or more interfering UEs for transmission of reference signal beams. The apparatus receives, from the at least one UE, a report indicating a set of the reference signal beams from the one or more interfering UEs based on measurements of the reference signal beams.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
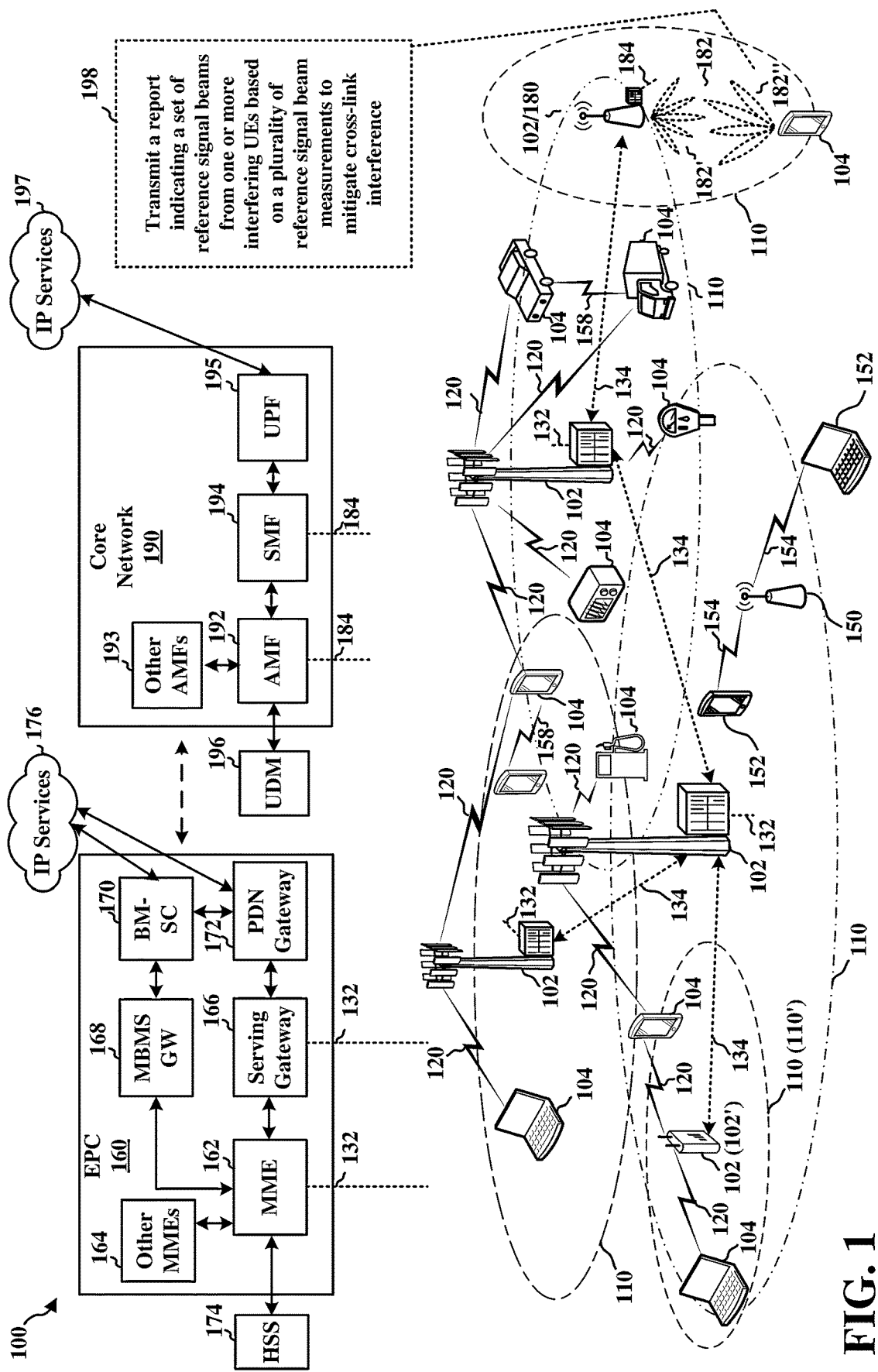
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit a report indicating a set of reference signal beams from one or more interfering UEs based on a plurality of reference signal beam measurements to mitigate cross-link interference. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kKz, where μ is the numerology 0 to 5. As such, the numerology μ=0 has a subcarrier spacing of 15 kHz and the numerology 1.1=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 its.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
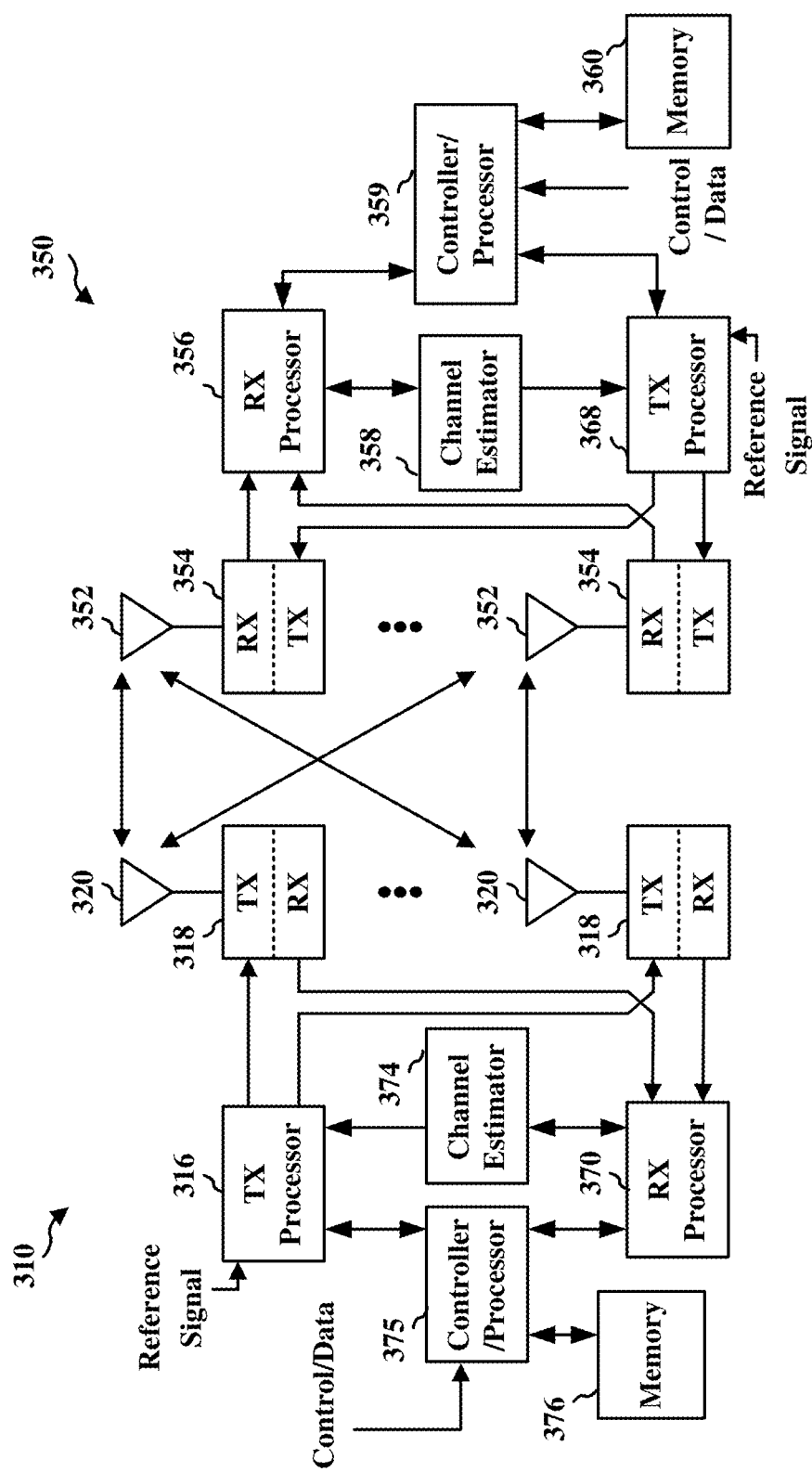
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

A base station and/or a UE may operate in the full-duplex (FD) mode enabling concurrent uplink and downlink transmissions in a given frequency range (e.g., Frequency Range 2 (FR2) including bands in the range 24.25 to 52.6 GHz). In some examples, integrated access and backhaul (IAB) nodes may operate in the full-duplex mode enabling concurrent transmission and reception between the IAB nodes. In other examples, a UE and a relay node may operate in the full-duplex mode enabling concurrent transmission and reception over an access link.

For example, a UE including first and second antenna panels may use its first antenna panel for uplink transmissions and may use its second antenna panel to receive downlink transmissions from a base station. As another example, a base station including first and second antenna panels may use its first antenna panel for downlink transmissions and may use its second antenna panel to receive uplink transmissions from a UE.

Full-duplex mode capability at a UE or a base station may be conditional on beam separation. For example, when a UE is transmitting uplink transmissions and is concurrently receiving downlink transmissions from a base station, the uplink transmissions may cause self-interference at the UE and may prevent successful reception of the downlink transmissions. In another example, when the base station is transmitting downlink transmissions and is concurrently receiving uplink transmissions from the UE, the downlink transmissions may cause self-interference at the base station and may prevent successful reception of the uplink transmissions. In other examples, clutter echoes may impact full-duplex mode operation at the UE or base station.

Since full-duplex mode operation may enable concurrent uplink and downlink transmissions at a UE and/or base station, communication latencies may be significantly reduced. For example, a UE may receive a downlink transmission in a slot or subframe designated for uplink transmissions. Moreover, full-duplex operation may enhance spectrum efficiency for a cell and/or a UE and may provide more efficient resource utilization.

Figure 4:
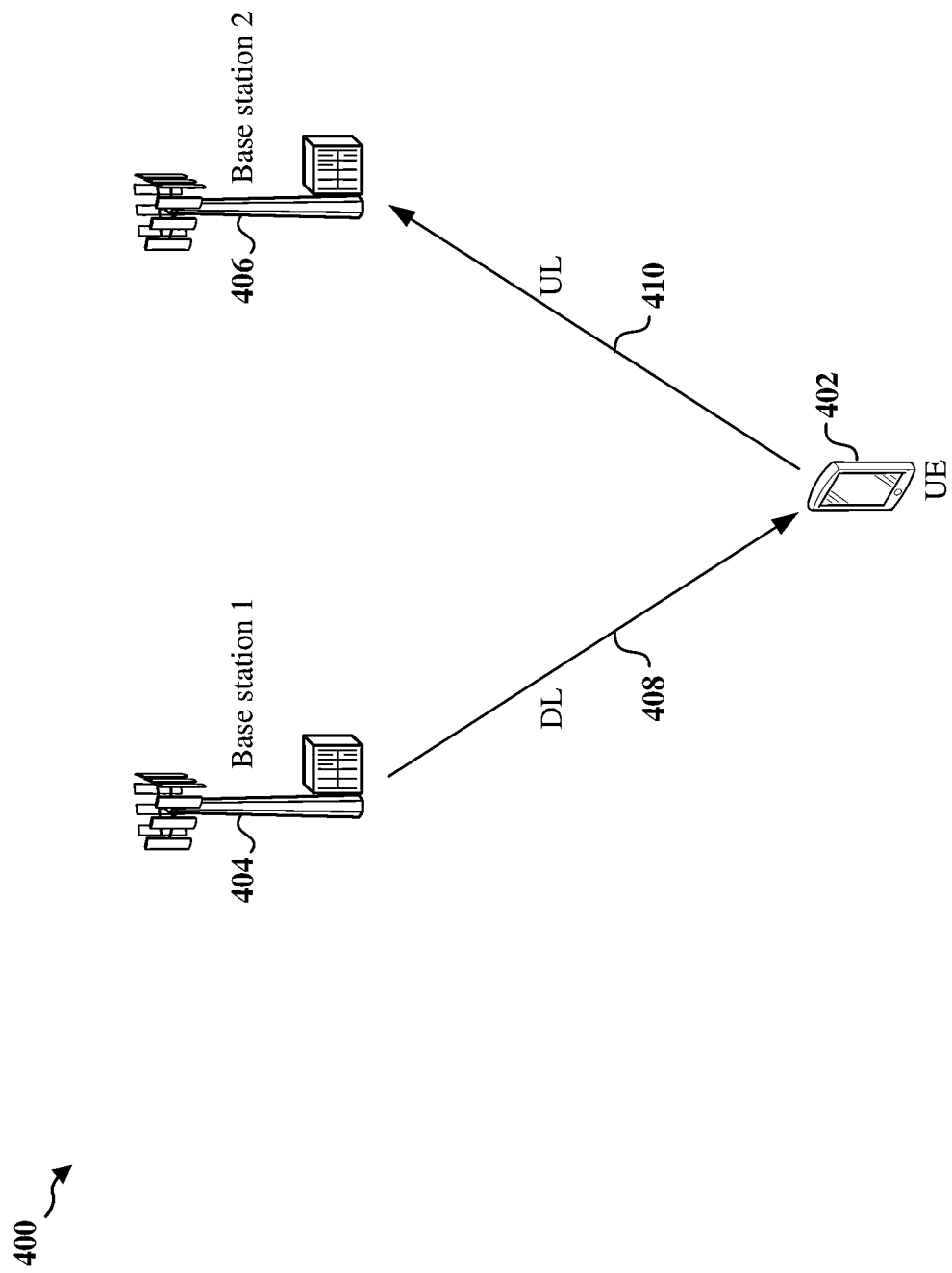
FIG. 4 illustrates an example network including a UE, a first base station, and a second base station.

FIG. 4 illustrates an example network 400 including a user equipment (UE) 402, a first base station 404, and a second base station 406. In the full-duplex mode use case shown in FIG. 4, the UE 402 may be operating in the full-duplex mode and the first and second base stations 404, 406 may be operating in a half-duplex mode. The UE 402 may receive downlink transmissions (e.g., downlink transmission 408) from the first base station 404 while concurrently transmitting uplink transmissions (e.g., uplink transmission 410) to the second base station 406. In the example of FIG. 4, the full-duplex mode may be enabled at the UE 402 and disabled at the first and second base stations 404, 406.

Figure 5:
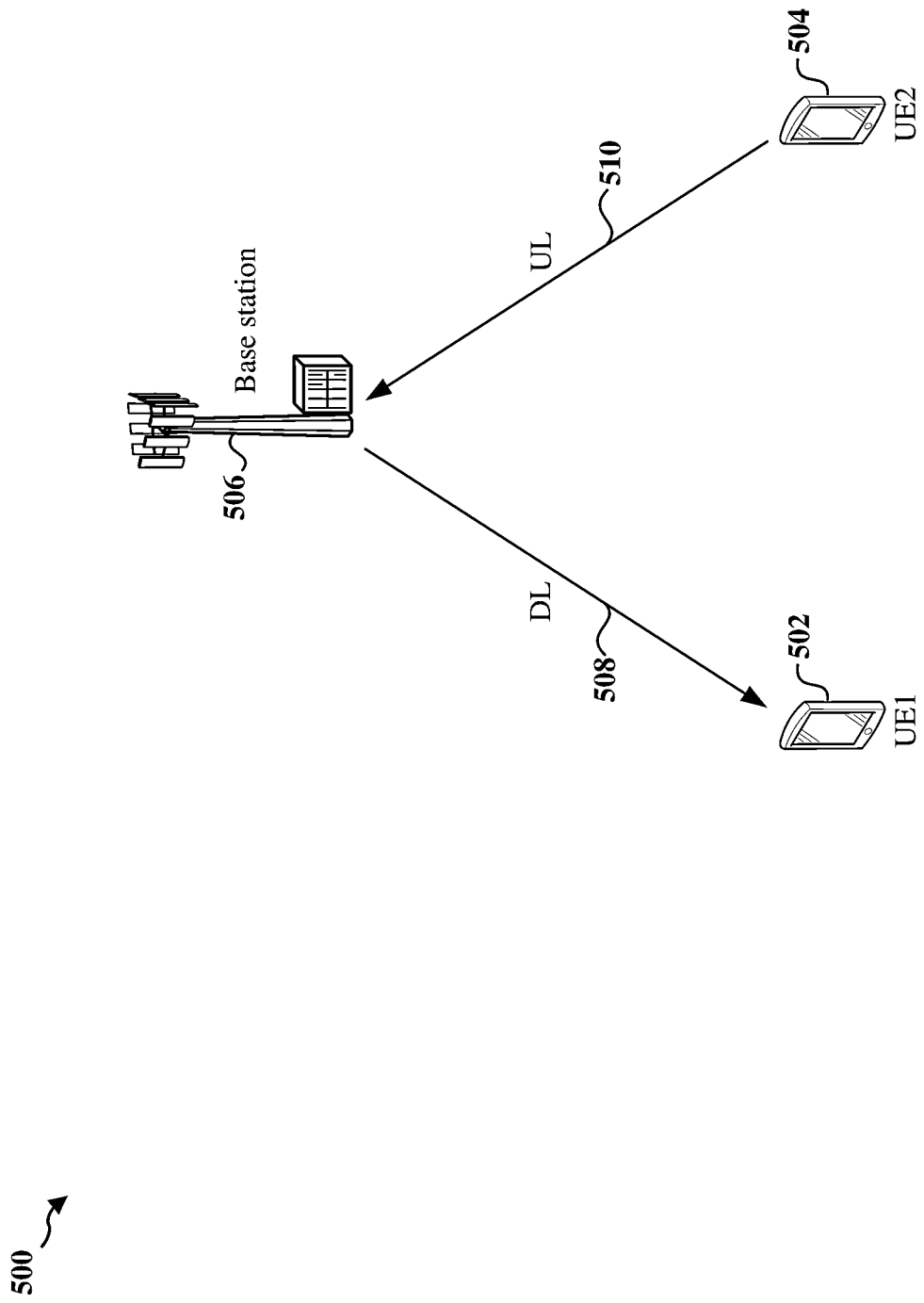
FIG. 5 illustrates an example network including a first UE, a second UE, and a base station.

FIG. 5 illustrates an example network 500 including a first user equipment (UE) 502, a second UE 504, and a base station 506. In the full-duplex mode use case shown in FIG. 5, the base station 506 may be operating in the full-duplex mode and the first and second UEs may be operating in a half-duplex mode. The base station 506 may transmit downlink transmissions (e.g., downlink transmission 508) to the first UE 502 while concurrently receiving uplink transmissions (e.g., uplink transmission 510) from the second UE 504. In the example of FIG. 5, the full-duplex mode may be enabled at the base station 506 may be disabled at the first and second UEs 502, 504.

Figure 6:
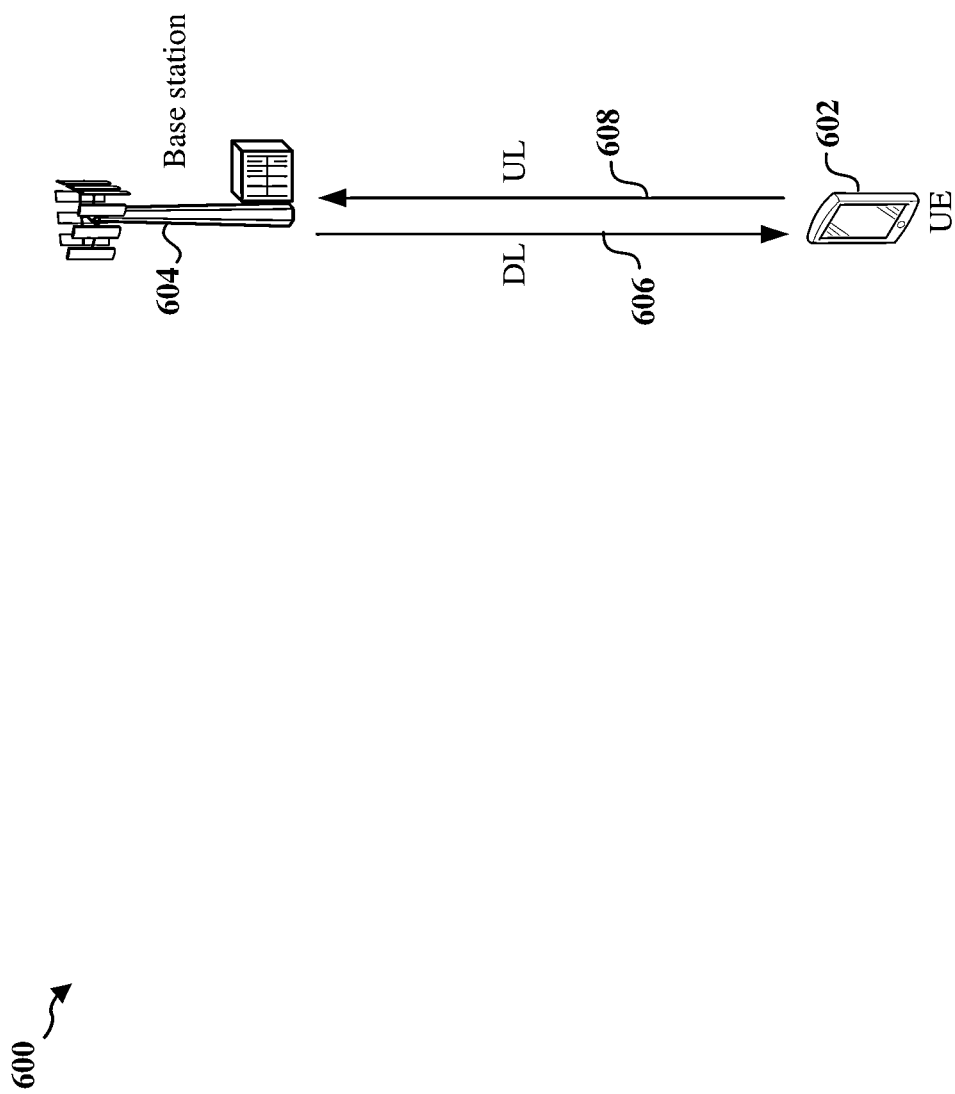
FIG. 6 illustrates an example network including a UE and a base station.

FIG. 6 illustrates an example network 600 including a UE 602 and a base station 604. In the full-duplex mode use case shown in FIG. 6, both the UE 602 and the base station 604 may be operating in the full-duplex mode. For example, the UE 602 may receive downlink transmissions (e.g., downlink transmission 606) from the base station 604 and may concurrently transmit uplink transmissions (e.g., uplink transmission 608) to the base station 604. Accordingly, the base station 604 may transmit downlink transmissions (e.g., downlink transmission 606) to the UE 602 and may concurrently receive uplink transmissions (e.g., uplink transmission 608) from the UE 602. In the example of FIG. 6, the full-duplex mode may be enabled at both the UE 602 and the base station 604.

Figure 7:
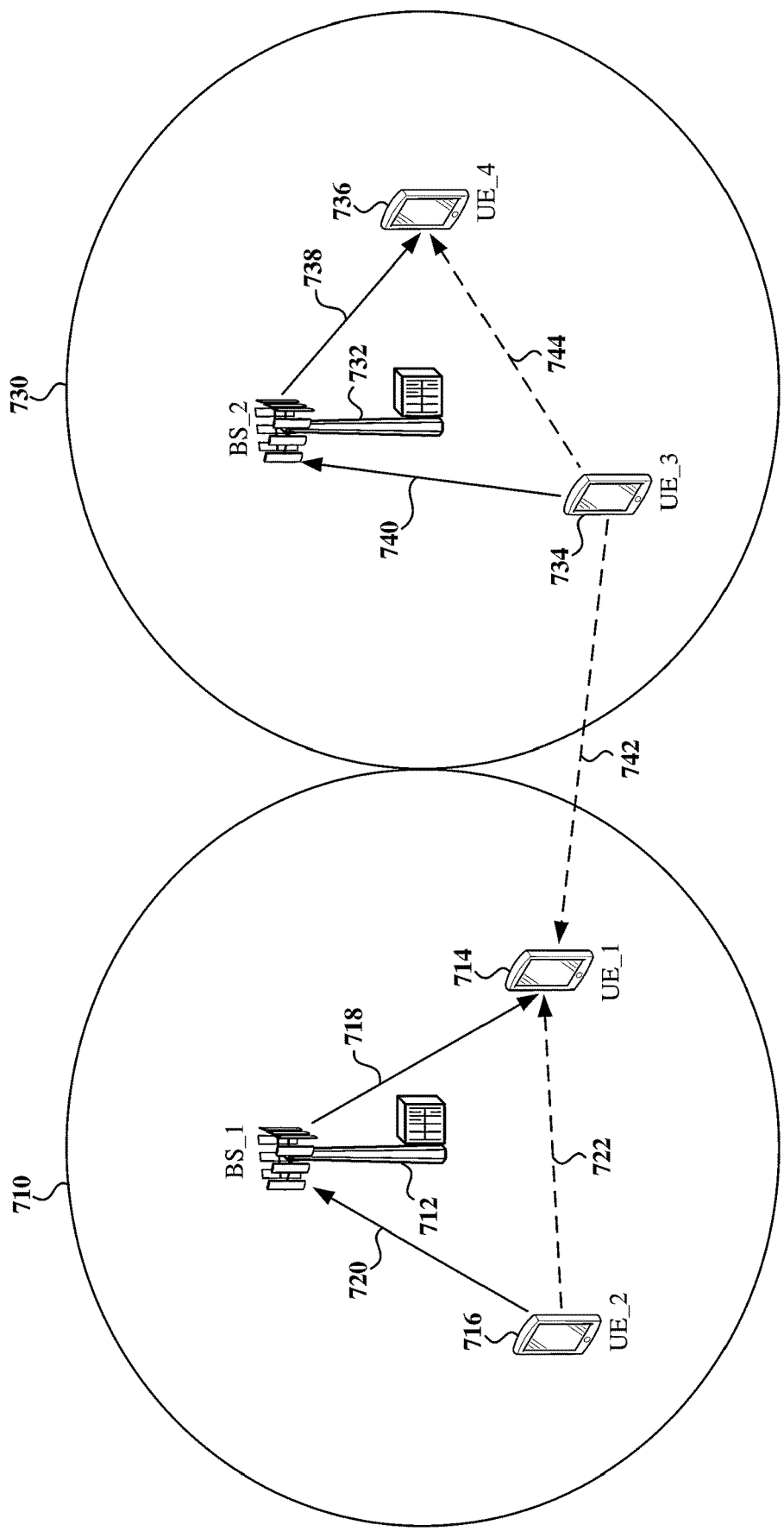
FIG. 7 illustrates a first cell and a second cell of a wireless communication network.

FIG. 7 illustrates a first cell 710 and a second cell 730 of a wireless communication network. In FIG. 7, a first base station (BS_1) 712 serves one or more UEs in the first cell 710, such as a first UE (UE_1) 714 and a second UE (UE_2) 716. A second base station (BS_2) 732 serves one or more UEs in the second cell 730, such as a third UE (UE_3) 734 and a fourth UE (UE_4) 736. The second cell 730 may be referred to as a neighbor cell with respect to the first cell 710, the second base station 732 may be referred to as a neighbor base station with respect to the first base station 712, and the third and fourth UEs 734, 736 may be referred to as neighbor UEs with respect to the first and second UEs 714, 716.

In some examples, the first base station 712 and the second base station 732 may operate in the full-duplex mode, while the UEs 714, 716, 734, 736 operate in the half-duplex mode. In one example, the first base station 712 may transmit a downlink (DL) signal 718 to the first UE 714 while receiving an uplink (UL) signal 720 transmitted from the second UE 716. The second base station 732 may transmit a downlink (DL) signal 738 to the fourth UE 736 while receiving an uplink (UL) signal 740 transmitted from the third UE 734.

In some scenarios, a UE receiving a DL signal from a base station may suffer interference (also referred to as cross-link interference (CLI) or inter-UE CLI) from UL signal transmissions from one or more different UEs located in the same cell or in a different cell. In one example, with reference to FIG. 7, when the first UE 714 is receiving the DL signal 718 from the first base station 712, the UL signal transmissions 720, 740 from the second and third UEs 716, 734 may introduce interfering signals (e.g., an interfering signal 722 from the second UE 716 and an interfering signal 742 from the third UE 734) to the DL signal 718. In another example, when the fourth UE 736 is receiving the DL signal 738 from the second base station 732, the UL signal transmission 740 from the third UE 734 may introduce an interfering signal 744 to the DL signal 738.

In some examples, a UE in a cell (e.g., UE 714, 716, 734, 736) may use a certain transmit beam to transmit a beamformed uplink signal (e.g., a beamformed reference signal, such as a sounding reference signal (SRS)) to its serving base station (e.g., the first base station 712 or the second base station 732) and may use a certain receive beam to receive a beamformed downlink signal from its serving base station. The aspects described herein allow a UE experiencing cross-link interference (also referred to as a victim UE) to measure and identify one or more uplink signal beams of a different UE causing the cross-link interference (also referred to as an aggressor UE) for purposes of mitigating the inter-UE cross-link interference.

Figure 8A:
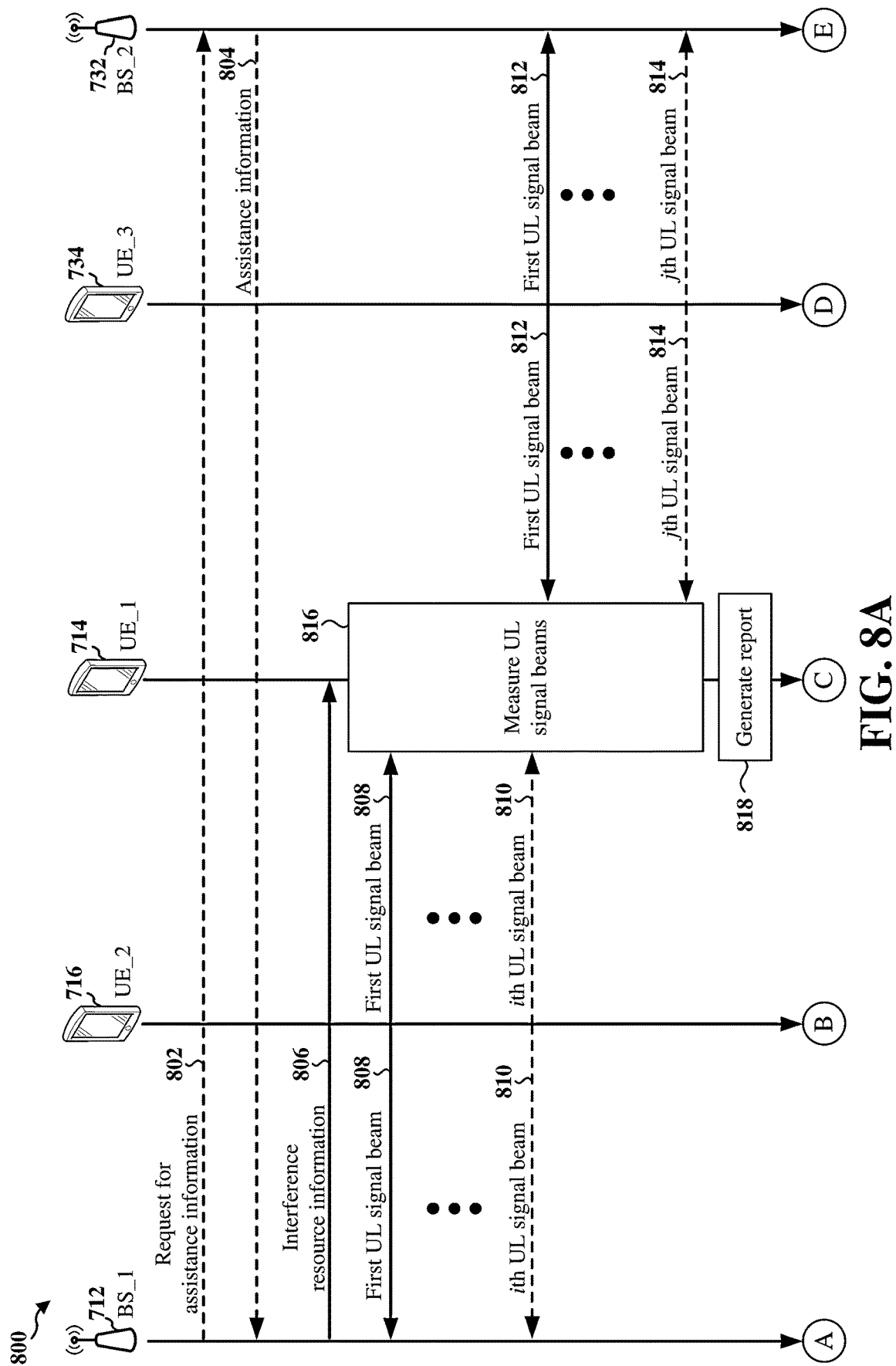
FIGS. 8A and 8B show a signal flow diagram in accordance with various aspects of the disclosure.
Figure 8B:
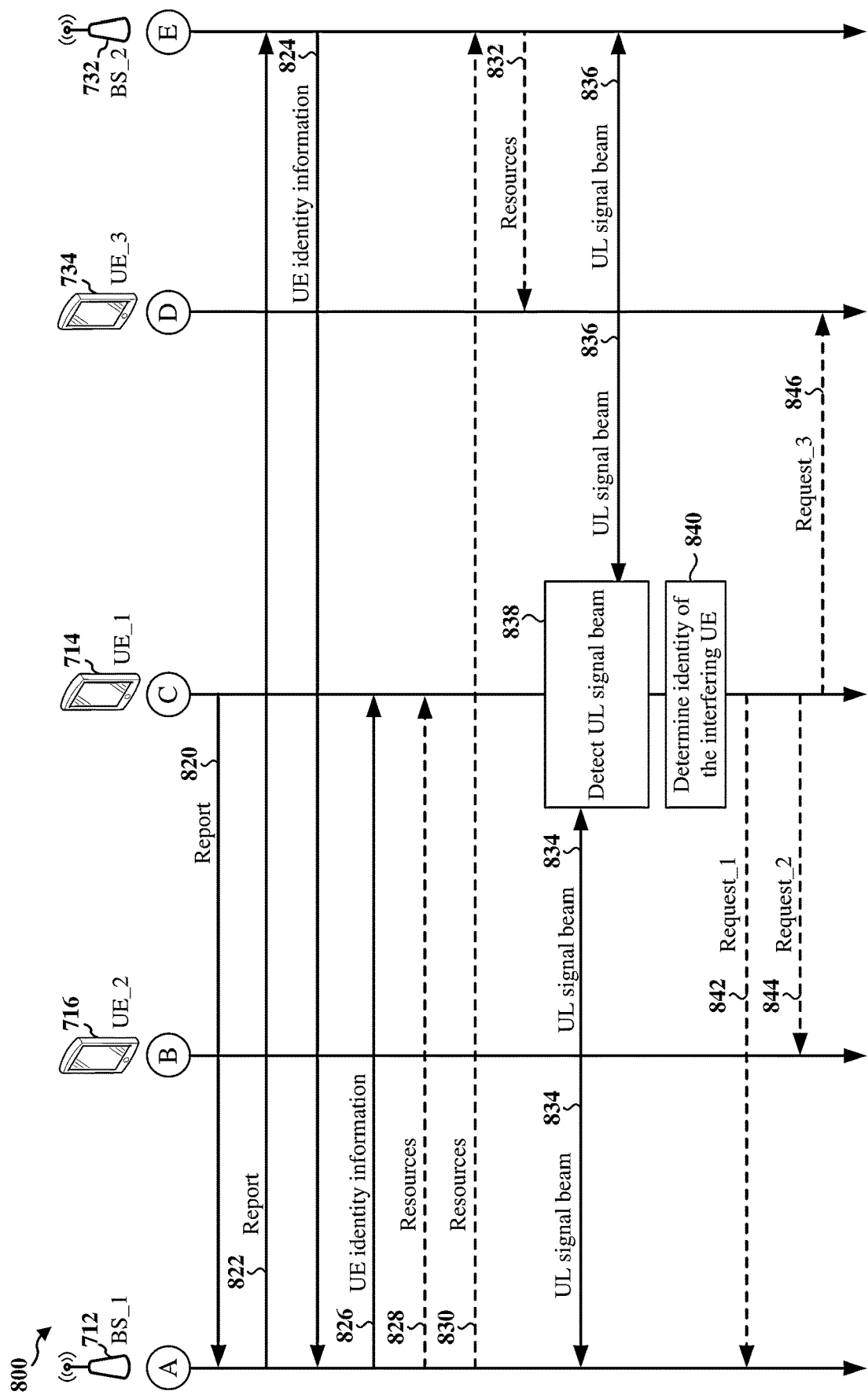

FIGS. 8A and 8B show a signal flow diagram 800 in accordance with various aspects of the disclosure. The signal flow diagram 800 includes the first UE (UE_1) 714, the second UE (UE_2) 716, the third UE (UE_3) 734, the first base station (BS_1) 712, and the second base station (BS_2) 732. It should be understood that arrows indicated with dashed lines in FIGS. 8A and 8B represent optional messages or signals.

With reference to FIG. 8A, the first base station 712 may transmit a message 802 (also referred to as an assistance information request message) including a request for assistance information to the second base station 732. For example, the assistance information may include first resource information indicating first resources allocated by the second base station 732 to one or more UEs in the second cell 730 (e.g., the third UE 734). For example, the first resources may include first time-frequency resources for transmission of beamformed uplink signals (also referred to as uplink signal beams). In some examples, the beamformed uplink signals may be beamformed reference signals (also referred to as reference signal beams), such as SRS, DM-RS, or other types of reference signals. The first base station 712 may receive a message 804 (also referred to as an assistance information message) from the second base station 732 including the requested assistance information.

In some examples, the first and second base stations 712, 732 may belong to the same central unit (CU), where the CU controls communications (e.g., the messages 802, 804, 822, 824) between the first and second base stations 712, 732. In some examples, the first and second base stations 712, 732 may belong to different CUs. In these examples, the different CUs may relay communications (e.g., the messages 802, 804, 822, 824) between the first and second base stations 712, 732.

The first base station 712 may transmit a message 806 including interference resource information (also referred to as an interference resource information message) to one or more UEs in the first cell 710, such as the first UE 714. In some aspects, the interference resource information in the message 806 may include the first resource information. In other aspects, the interference resource information in the message 806 may include second resource information indicating second resources allocated by the first base station 712 to one or more UEs in the first cell 710, such as the second UE 716. For example, the second resources may include second time-frequency resources for transmission of reference signal beams. In other aspects, the interference resource information in the message 806 may indicate at least the first resource information and the second resource information.

In some examples, the message 806 may include quasi-colocation (QCL) information associated with at least one receive beam for the first UE 714. In some examples, the at least one receive beam may enable reception of one or more interfering reference signal beams.

The second UE 716 may transmit one or more uplink signal beams to the first base station 712. In some examples, each of the uplink signal beams transmitted from the second UE 716 may be a beamformed reference signal (also referred to as a reference signal beam), such as an SRS, DM-RS, or other type of reference signal. For example, the second UE 716 may transmit a first uplink signal beam 808 through an ith uplink signal beam 810, where i represents a positive integer greater than or equal to two. As shown in FIG. 8A, each uplink signal beam transmitted from the second UE 716 to the first base station 712 may also arrive at the first UE 714 as an interfering signal beam. For example, the first uplink signal beam 808 through the ith uplink signal beam 810 may arrive at the first UE 714 as interfering signal beams.

The third UE 734 may transmit one or more uplink signal beams to the second base station 732. In some examples, each of the uplink signal beams transmitted from the third UE 734 may be a beamformed reference signal (also referred to as a reference signal beam), such as an SRS, DM-RS, or other type of reference signal. For example, the third UE 734 may transmit a first uplink signal beam 812 through a jth uplink signal beam 814, where j represents a positive integer greater than or equal to two. As shown in FIG. 8A, each uplink signal beam transmitted from the third UE 734 to the second base station 732 may also arrive at the first UE 714 as an interfering signal beam. For example, the first uplink signal beam 812 through the jth uplink signal beam 814 may arrive at the first UE 714 as interfering signal beams.

At 816, the first UE 714 may measure one or more uplink signal beams from one or more interfering UEs, such as the second UE 716 and/or the third UE 734. For example, the first UE 714 may measure the first uplink signal beam 808 through the ith uplink signal beam 810. In some aspects of the disclosure, the first UE 714 may measure the first uplink signal beam 808 through the ith uplink signal beam 810 based on the interference resource information in the message 806. For example, the first UE 714 may use the second time-frequency resources in the interference resource information to receive and measure the first uplink signal beam 808 through the ith uplink signal beam 810.

The first UE 714 may further measure the first uplink signal beam 812 through the jth uplink signal beam 814. In some aspects of the disclosure, the first UE 714 may measure the first uplink signal beam 812 through the jth uplink signal beam 814 based on the interference resource information in the message 806. For example, the first UE 714 may use the first time-frequency resources in the interference resource information to receive and measure the first uplink signal beam 812 through the jth uplink signal beam 814.

Therefore, at 816, the first UE 714 may obtain one or more uplink signal beam measurements (e.g., reference signal beam measurements) from one or more interfering UEs. The uplink signal beam measurements may include beam strength measurements of one or more uplink signal beams, such as reference signal received power (RSRP) measurements and/or received signal strength indicator (RSSI) measurements.

In some aspects of the present disclosure, the one or more uplink signal beams measured at 816 may include repetitions of the same uplink signal beam. In some examples, the first UE 714 may measure each repetition of the uplink signal beam using different receive beams at the first UE 714. This is described in detail with reference to FIGS. 9A, 9B, 9C, and 9D.

Figure 9A:
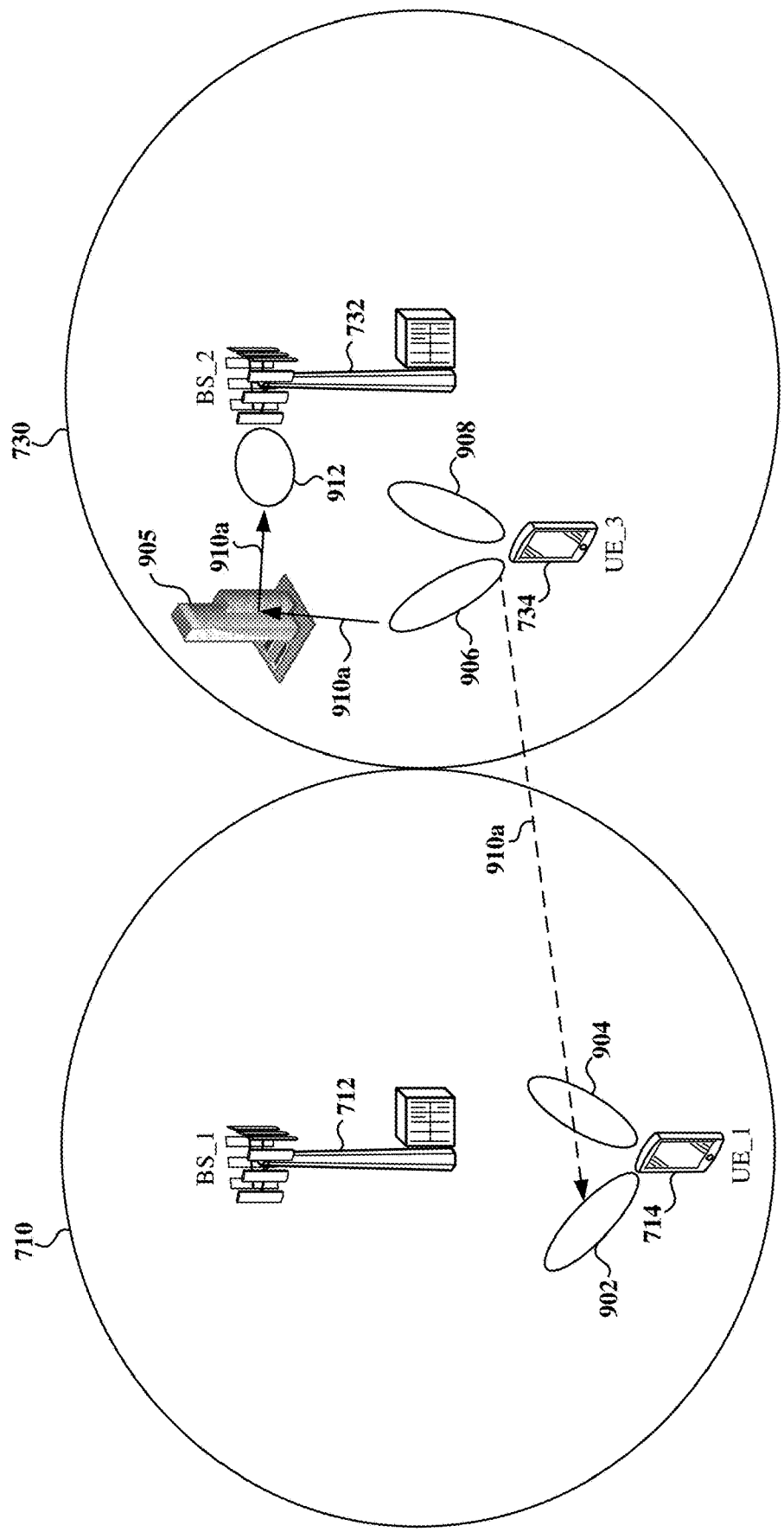
FIGS. 9A, 9B, 9C, and 9D illustrate example receive beams of a UE for measurement of repetitions of reference signal beams from an interfering UE.

FIGS. 9A, 9B, 9C, and 9D illustrate example receive beams of the first UE 714 for measurement of repetitions of reference signal beams from an interfering UE. With reference to FIG. 9A, the first UE 714 may form one or more receive beams, such as a first receive beam 902 and a second receive beam 904, for receiving downlink signal beams from the first base station 712. The third UE 734 may form one or more transmit beams, such as a first transmit beam 906 and a second transmit beam 908, for transmitting uplink signal beams to the second base station 732.

The first UE 714 may use the first receive beam 902 to measure a first repetition of a first uplink signal beam from the third UE 734. For example, the third UE 734 may transmit a first repetition of a first reference signal beam 910*a* to the second base station 732. In the example of FIG. 9A, the first repetition of the first reference signal beam 910*a* is reflected from a structure 905 (e.g., a building, a wall, or other type of structure) toward a first receive beam 912 of the second base station 732. As shown in FIG. 9A, the first repetition of the first reference signal beam 910*a* may arrive at the first UE 714 as an interfering reference signal beam (e.g., indicated with a dashed arrow labeled 910*a* in FIG. 9A). The first UE 714 may use the first receive beam 902 to measure the first reference signal beam 910*a* from the third UE 734.

Figure 9B:
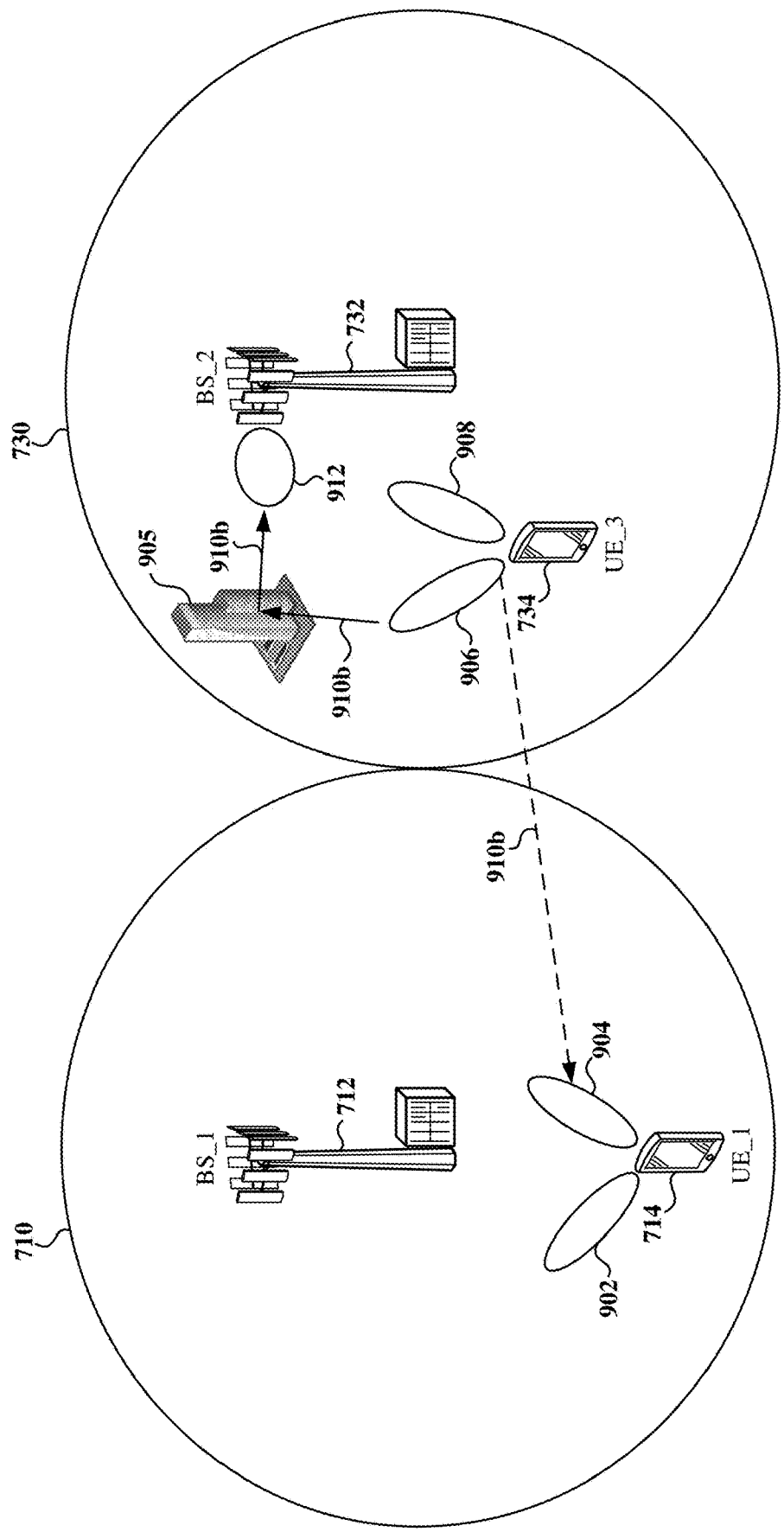

With reference to FIG. 9B, the third UE 734 may transmit a second repetition of the first reference signal beam 910*b* to the second base station 732. The second base station 732 may receive the second repetition of the first reference signal beam 910*b* at the first receive beam 912. As shown in FIG. 9B, the second repetition of the first reference signal beam 910*b* may arrive at the first UE 714 as an interfering reference signal beam (e.g., indicated with a dashed arrow labeled 910*b* in FIG. 9B). The first UE 714 may use the second receive beam 904 to measure the first reference signal beam 910*b* from the third UE 734.

Figure 9C:
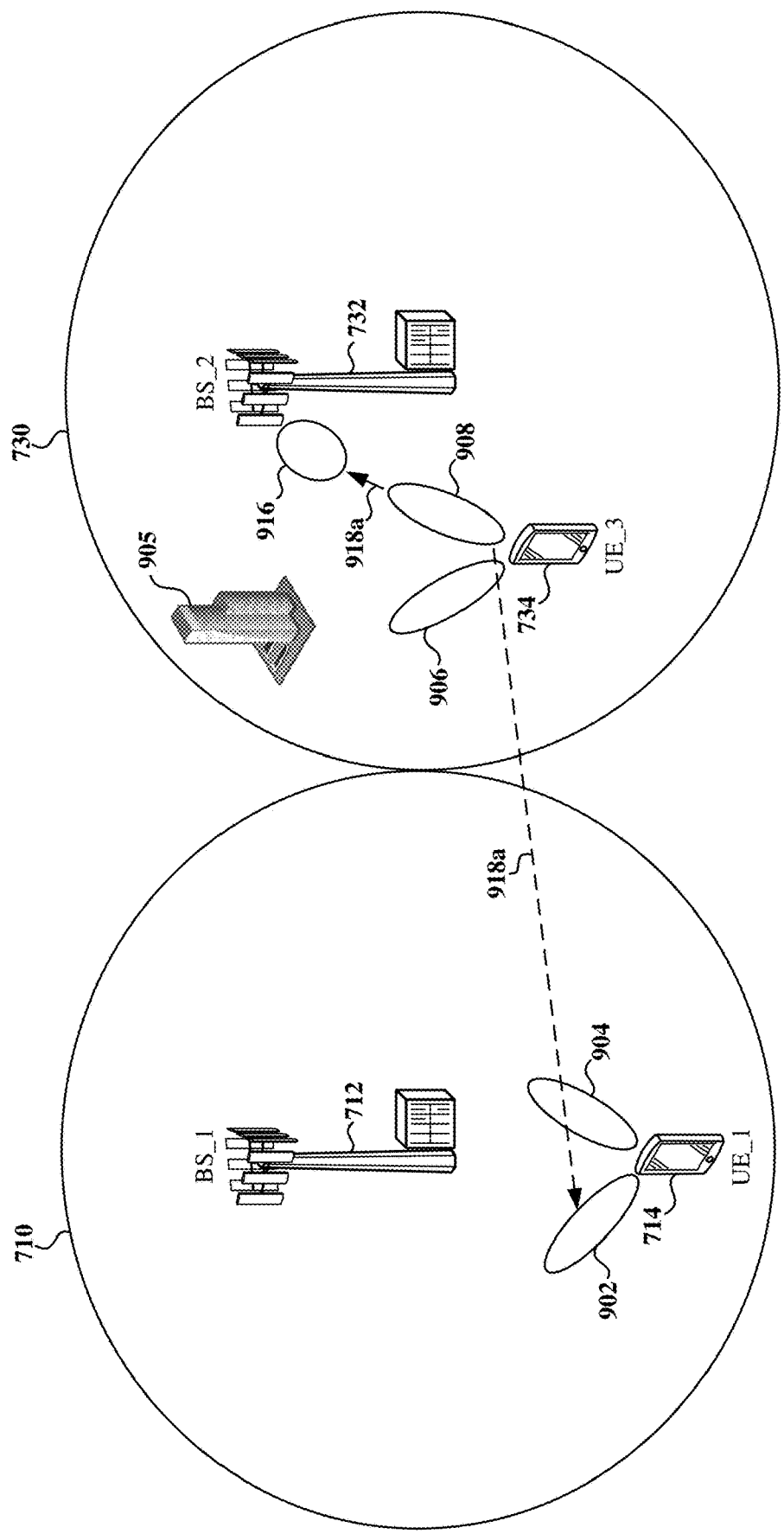

With reference to FIG. 9C, the third UE 734 may transmit a first repetition of a second reference signal beam 918*a* to the second base station 732. The second base station 732 may receive the first repetition of the second reference signal beam 918*a* at a second receive beam 916. As shown in FIG. 9C, the first repetition of the second reference signal beam 918*a* may arrive at the first UE 714 as an interfering reference signal beam (e.g., indicated with a dashed arrow labeled 918*a* in FIG. 9C). The first UE 714 may use the first receive beam 902 to measure the second reference signal beam 918*a* from the third UE 734.

Figure 9D:
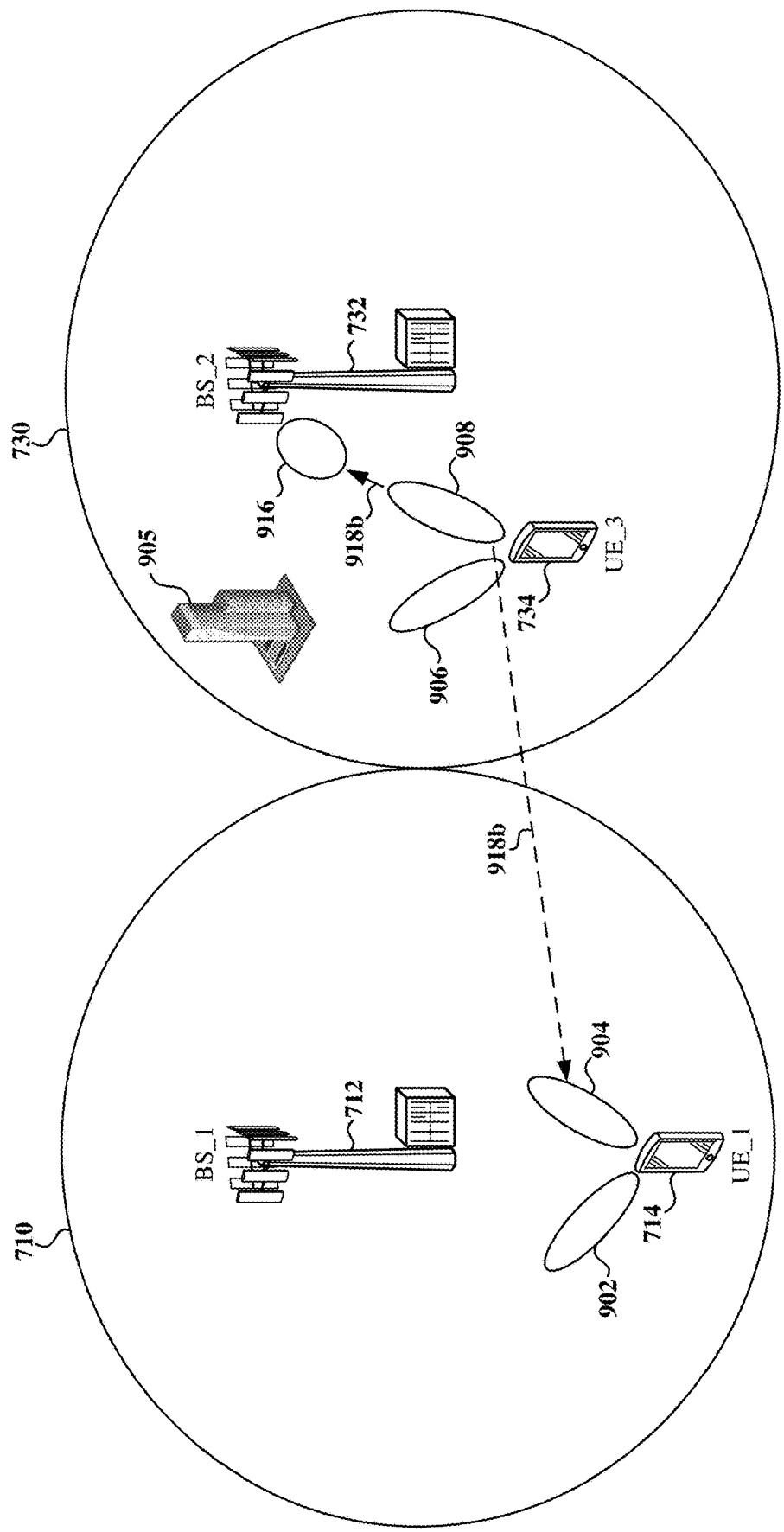

With reference to FIG. 9D, the third UE 734 may transmit a second repetition of the second reference signal beam 918*b* to the second base station 732. The second base station 732 may receive the second repetition of the second reference signal beam 918*b* at the second receive beam 916. As shown in FIG. 9D, the second repetition of the second reference signal beam 918*b* may arrive at the first UE 714 as an interfering reference signal beam (e.g., indicated with a dashed arrow labeled 918*b* in FIG. 9D). The first UE 714 may use the second receive beam 904 to measure the second reference signal beam 918*b* from the third UE 734.

Referring back to FIG. 8A, at 818, the first UE 714 may generate a report indicating a set of reference signal beams from the one or more interfering UEs based on the signal beam measurements (e.g., reference signal beam measurements). In a first example, the set of the reference signal beams may include M strongest reference signal beams from each of the one or more interfering UEs, where M is a positive integer. The value of M may be preconfigured at the first UE 714 or may be configured by the first base station 712.

For example, if M is set to two (e.g., M=2), the first UE 714 may determine two uplink signal beams from among the first uplink signal beam 808 through the ith uplink signal beam 810 from the second UE 716 having the highest beam strength measurements (e.g., highest RSRP values and/or highest RSSI values). The first UE 714 may include the resources associated with the two uplink signal beams from the second UE 716 in the report. If the first uplink signal beam 808 through the ith uplink signal beam 810 from the second UE 716 are reference signal beams, these resources may indicate the two reference signal beams from the second UE 716 causing the highest interference to the first UE 714.

Continuing with this example, the first UE 714 may further determine two uplink signal beams from among the first uplink signal beam 812 through the jth uplink signal beam 814 from the third UE 734 having the highest beam strength measurements (e.g., highest RSRP values and/or highest RSSI values). The first UE 714 may further include the resources associated with the two uplink signal beams from the third UE 734 in the report. If the first uplink signal beam 812 through the jth uplink signal beam 814 from the third UE 734 are reference signal beams, these resources may indicate the two reference signal beams from the third UE 734 causing the highest interference to the first UE 714.

In a second example, the set of the reference signal beams may include N weakest reference signal beams from each of the one or more interfering UEs, where N is a positive integer. The value of N may be preconfigured at the first UE 714 or may be configured by the first base station 712. For example, if N is set to two (e.g., N=2), the first UE 714 may determine two uplink signal beams from among the first uplink signal beam 808 through the ith uplink signal beam 810 from the second UE 716 having the lowest beam strength measurements (e.g., lowest RSRP values and/or lowest RSSI values). The first UE 714 may include the resources associated with the two uplink signal beams from the second UE 716 in the report. If the first uplink signal beam 808 through the ith uplink signal beam 810 from the second UE 716 are reference signal beams, these resources may indicate the two reference signal beams from the second UE 716 causing the least amount of interference to the first UE 714.

Continuing with the second example, the first UE 714 may further determine two uplink signal beams from among the first uplink signal beam 812 through the jth uplink signal beam 814 from the third UE 734 having the lowest beam strength measurements (e.g., lowest RSRP values and/or lowest RSSI values). The first UE 714 may further include the resources associated with the two uplink signal beams from the third UE 734 in the report. If the first uplink signal beam 812 through the jth uplink signal beam 814 from the third UE 734 are reference signal beams, these resources may indicate the two reference signal beams from the third UE 734 causing the least amount of interference to the first UE 714.

In a third example, the set of the reference signal beams may include K strongest reference signal beams across all interfering UEs, where K is a positive integer. The value of K may be preconfigured at the first UE 714 or may be configured by the first base station 712. For example, if K is set to two (e.g., K=2), the first UE 714 may determine two uplink signal beams having the highest beam strength measurements (e.g., highest RSRP values and/or highest RSSI values) from among all uplink signal beams (e.g., the first uplink signal beam 808 through the ith uplink signal beam 810, and the first uplink signal beam 812 through the jth uplink signal beam 814). The first UE 714 may include the resources associated with the two uplink signal beams (e.g., from the second UE 716 and/or the third UE 734) in the report. If the first uplink signal beam 808 through the ith uplink signal beam 810 and the first uplink signal beam 812 through the jth uplink signal beam 814 are reference signal beams, these resources may indicate the two reference signal beams from the second UE 716 and/or the third UE 734 causing the highest interference to the first UE 714.

In a fourth example, the set of the reference signal beams may include L weakest reference signal beams across all interfering UEs, where L is a positive integer. The value of L may be preconfigured at the first UE 714 or may be configured by the first base station 712. For example, if L is set to two (e.g., L=2), the first UE 714 may determine two uplink signal beams having the lowest beam strength measurements (e.g., lowest RSRP values and/or lowest RSSI values) from among all uplink signal beams (e.g., the first uplink signal beam 808 through the ith uplink signal beam 810 and the first uplink signal beam 812 through the jth uplink signal beam 814). The first UE 714 may include the resources associated with the two uplink signal beams (e.g., from the second UE 716 and/or the third UE 734) in the report. If the first uplink signal beam 808 through the ith uplink signal beam 810 and the first uplink signal beam 812 through the jth uplink signal beam 814 are reference signal beams, these resources may indicate the two reference signal beams from the second UE 716 and/or the third UE 734 causing the least amount of interference to the first UE 714.

In some examples, the set of the reference signal beams includes a first subset of the reference signal beams. Each reference signal beam in the first subset may have a reference signal beam measurement that is greater than or equal to a threshold (also referred to as a subset threshold). The set of the reference signal beams may further include a second subset of the reference signal beams. Each reference signal beam in the second subset may have a reference signal beam measurement that is less than the threshold (e.g., the subset threshold).

An example of a report generated at 818 if FIG. 8A is shown in Table 1.

TABLE 1

| Resource | Measurement |
|---|---|
| Resource 1 | Measurement 1 |
| Resource 2 | Measurement 2 |
| . | . |
| . | . |
| . | . |
| Resource Z | Measurement Z |

In Table 1, each row includes a resource and a measurement of an uplink signal beam received on that resource. For example, Resource 1 may represent certain time resources (e.g., a slot, a symbol, etc.) and certain frequency resources (e.g., one or more physical resource blocks (PRBs)) allocated to an interfering UE. Measurement 1 may represent a measurement (e.g., a reference signal received power (RSRP) value expressed in units of decibels (dB)) of an uplink signal beam (e.g., a reference signal beam, such as an SRS) received on Resource 1. As indicated in Table 1, a report from the first UE 714 may include up to Z resources and measurements, where Z represents a positive integer.

In some examples, a resource in Table 1 (e.g., Resource 1) may be associated with one or more beams formed at an interfering UE. Therefore, in some aspects of the disclosure, a base station that allocated the resource (e.g., Resource 1) to an interfering UE for transmission of an uplink signal beam (e.g., a reference signal beam) may determine the identity of the interfering UE and the beam formed at the interfering UE from the resource.

In some aspects of the disclosure, the report may include a bitmap, where each bit in the bitmap is associated with a different reference signal beam from an interfering UE (e.g., the second UE 716 and/or the third UE 734). The first UE 714 may be configured to set a bit corresponding to a reference signal beam to a first value (e.g., '1') if a measurement of that reference signal beam is greater than or equal to a threshold, or to a second value (e.g., '0') if the measurement of that reference signal beam is less than the threshold. In some examples, the measurement of the reference signal beam may be any one of the uplink signal beam measurements at 816.

With reference to FIG. 8B, the first UE 714 may transmit a message 820 including the report generated at 818 to the first base station 712. In some examples, the first UE 714 may transmit the message 820 including the report in a physical data channel (e.g., PUSCH) and/or a physical control channel (e.g., PUCCH). In some examples, the first UE 714 may transmit the message 820 including the report periodically, aperiodically, semi-persistently, or in response to a trigger (e.g., a trigger event or a condition). In some examples, the trigger may be a reception of an uplink signal beam having a strength measurement that exceeds a threshold strength value. In some examples, the trigger occurs when a signal-to-noise and interference ratio (SINR) at the first UE 714 is reduced by an amount that exceeds a threshold.

In some aspects of the disclosure, the first base station 712 may transmit a message 822 to the second base station 732 including the report received in the message 820. The second base station 732 may transmit a message 824 to the first base station 712 including identity information of at least one UE (also referred to as UE identity information) in the second cell 730 based on the report. In some examples, the message 824 may include identity information for one or more of the reference signal beams in the set of reference signal beams included in the report. The identity information may include an index number associated with a UE in the second cell 730, a unique identifier associated with the UE in the second cell 730, and/or other suitable value associated with a UE in the second cell 730.

The first base station 712 may transmit a message 826 including information (also referred to as UE identity information) that enables the first UE 714 to identify an interfering UE in the first cell 710 (e.g., the second UE 716) or an interfering UE in the second cell 730 (e.g., the third UE 734) based on an uplink signal beam received from the interfering UE. In some examples, the UE identity information in the message 826 may include a list of resources used by interfering UEs for transmission of uplink signal beams and a UE identifier associated with each of the resources in the list. Therefore, if the first UE 714 detects an uplink signal beam (e.g., a reference signal beam) from an interfering UE on a certain resource (e.g., a time-frequency resource), the first UE 714 may find the certain resource in the UE identity information and may determine the UE identifier corresponding to the certain resource in the UE identity information.

The first base station 712 may transmit a message 828 that allocates resources to one or more UEs in the first cell 710 (e.g., the first UE 714) based at least on the report in the message 820. In some examples, the resources in the message 828 may be based on the identity of an interfering UE and time-frequency resources allocated to the interfering UE as indicated in the report in the message 820. For example, the resources in the message 828 may include time-frequency resources different from time-frequency resources allocated to the interfering UE to avoid or mitigate cross-link interference at the first UE 714. In one example scenario, the resources in the message 828 allocated to the first UE 714 may include time-frequency resources different from time-frequency resources allocated to the second UE 716 and the third UE 734.

The first base station 712 may transmit a message 830 to the second base station 732 that indicates the resources allocated to one or more UEs in the first cell 710 (e.g., the first UE 714). The second base station 732 may consider the resources in the message 830 when allocating resources to one or more UEs in the second cell 730 (e.g., the third UE 734). For example, the second base station 732 may transmit a message 832 that allocates resources to the third UE 734, where the resources in the message 832 include different time-frequency resources relative to the resources in the message 830 to avoid or mitigate interference from the third UE 734 to the first UE 714.

With reference to FIG. 8B, the second UE 716 may transmit one or more uplink signal beams to the first base station 712. For example, the second UE 716 may transmit an uplink signal beam 834. In some examples, the uplink signal beam 834 may be a beamformed reference signal (also referred to as a reference signal beam), such as an SRS, DM-RS, or other type of reference signal. The second UE 716 may transmit the uplink signal beam 834 before a transmission on a PUSCH or PUCCH. As shown in FIG. 8B, the uplink signal beam 834 from the second UE 716 to the first base station 712 may also arrive at the first UE 714 as an interfering signal beam.

The third UE 734 may transmit one or more uplink signal beams to the second base station 732. For example, the third UE 734 may transmit an uplink signal beam 836 to the second base station 732. In some examples, the uplink signal beam 836 may be a beamformed reference signal (also referred to as a reference signal beam), such as an SRS, DM-RS, or other type of reference signal. The third UE 734 may transmit the uplink signal beam 836 before a transmission on a PUSCH or PUCCH. As shown in FIG. 8B, the uplink signal beam 836 may also arrive at the first UE 714 as an interfering signal beam.

At 838, the first UE 714 may detect the uplink signal beam 834 from the second UE 716 and/or the uplink signal beam 836 from the third UE 734. For example, the first UE 714 may detect an SRS or a DM-RS from an interfering UE (uplink signal beam 834 and/or the uplink signal beam 836). At 840, the first UE 714 may determine an identity of the interfering UE based on the detected reference signal beam and the UE identity information in the message 826.

The first UE 714 may optionally transmit a request message (also referred to as feedback or a feedback message) to one or more interfering UEs (e.g., the second UE 716 and/or the third UE 734) or to the first base station 712 to mitigate cross-link interference with the one or more interfering UEs. In some examples, the first UE 714 may transmit a first request message (Request_1) 842 to the first base station 712. The first request message 842 may include a request that an interfering UE (e.g., the second UE 716 and/or the third UE 734) not transmit an uplink signal transmission (e.g., a reference signal beam, such as an SRS, DM-RS, etc.), a request for the interfering UE to reduce a transmit power of an uplink signal transmission, or a request for the interfering UE to change a transmit beam for the uplink signal transmission.

In some examples, the first UE 714 may optionally transmit a second request message (Request_2) 844 to an interfering UE in the same cell (e.g., to the second UE 716 in the first cell 710). For example, the first UE 714 may perform a discovery procedure to discover the second UE 716 and may establish a sidelink connection with the second UE 716. In this example, the first UE 714 may transmit the second request message 844 to the second UE 716 via the sidelink connection. In some examples, the second request message 844 may include a request that the second UE 716 not transmit an uplink signal transmission, a request for the second UE 716 to reduce a transmit power of an uplink signal transmission (e.g., a request for the second UE 716 to apply a power backoff), or a request for the second UE 716 to change a transmit beam for the uplink signal transmission. For example, the uplink signal transmission may be a reference signal beam, such as an SRS, DM-RS, etc.

In some examples, the first UE 714 may optionally transmit a third request message (Request_3) 846 to an interfering UE in a neighboring cell (e.g., to the third UE 734 in the second cell 730). For example, the first UE 714 may perform a discovery procedure to discover the third UE 734 and may establish a sidelink connection with the third UE 734. In this example, the first UE 714 may transmit the third request message 846 to the third UE 734 via the sidelink connection. In some examples, the third request message 846 may include a request that the third UE 734 not transmit an uplink signal transmission, a request for the third UE 734 to reduce a transmit power of an uplink signal transmission (e.g., a request for the third UE 734 to apply a power backoff), or a request for the third UE 734 to change a transmit beam for the uplink signal transmission. For example, the uplink signal transmission may be a reference signal beam, such as an SRS, DM-RS, etc.

In some examples, the first request message 842, the second request message 844, and/or the third request message 846, may be transmitted in response to a trigger. In some examples, the trigger occurs when a level of interference at the first UE 714 exceeds a threshold. For example, the trigger occurs when a signal-to-noise and interference ratio (SINR) at the first UE 714 is reduced by an amount that exceeds a threshold. In some examples, the threshold may be a value in units of dB.

In some aspects, the first base station 712 may receive, from a UE in the first cell 710, a first report indicating a first set of reference signal beams from one or more interfering UEs based on first reference signal beam measurements. The second base station 732 may receive, from a UE in the second cell 730, a second report indicating a second set of reference signal beams from one or more interfering UEs based on second reference signal beam measurements. The first and second base stations 712, 714 may exchange the first and second reports to identify interfering UEs (e.g., aggressor UEs) and UEs experiencing interference (e.g., victim UEs) for purposes of mitigating inter-UE cross-link interference. For example, the first and second base stations 712, 714 may exchange scheduling information for the identified UEs to allow each of the first and second base stations 712, 714 to avoid scheduling UEs experiencing interference on the same resources (e.g., time-frequency resources) as the interfering UEs.

Figure 10:
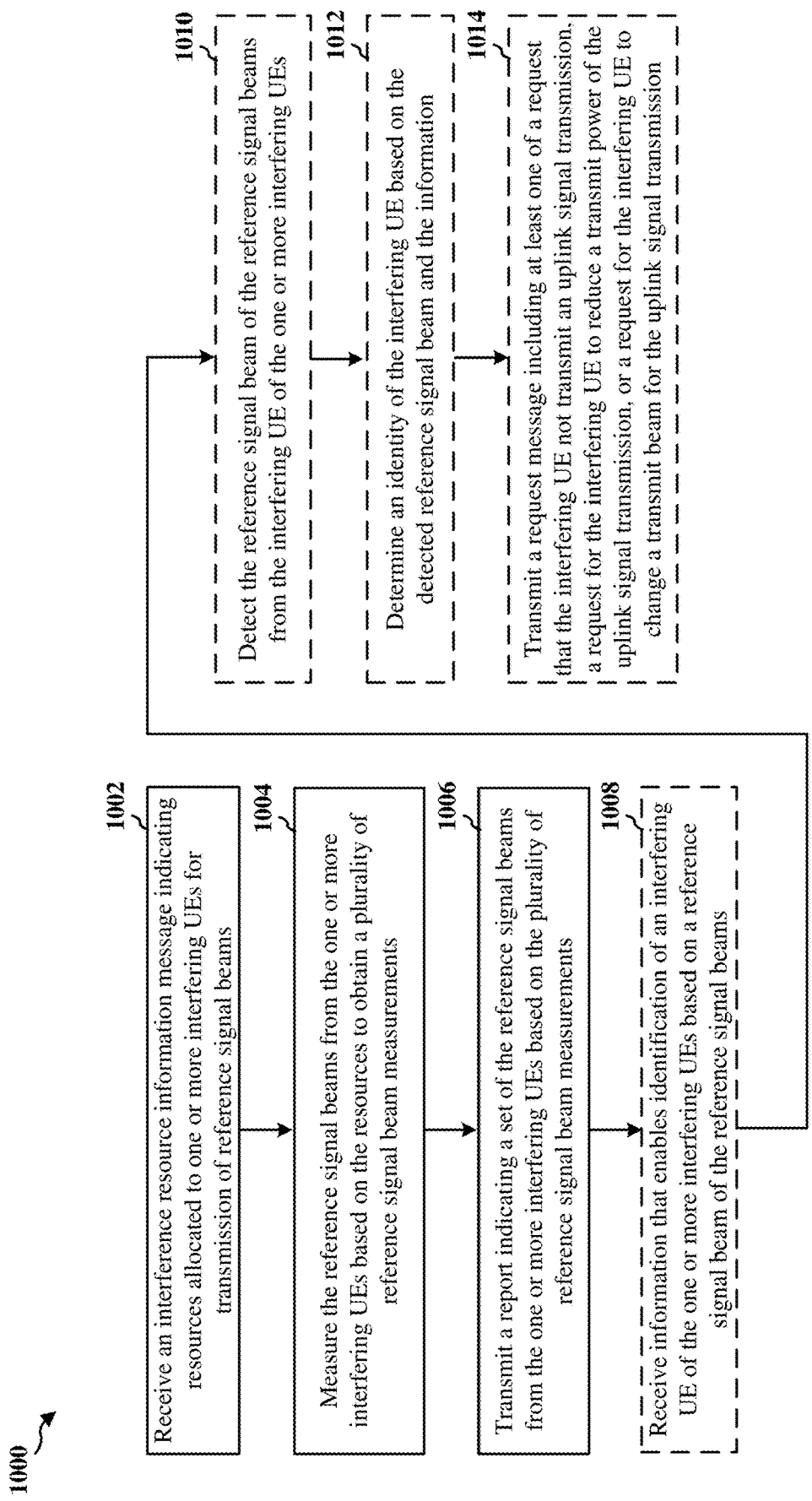
FIG. 10 is a flowchart of a method of wireless communication.

FIG. 10 is a flowchart 1000 of a method of wireless communication. The method may be performed by a UE (e.g., the UE 104, 714; the apparatus 1102/1102'; the processing system 1214, which may include the memory 360 and which may be the entire UE 104, 714 or a component of the UE 104, 714, such as the TX processor 368, the RX processor 356, and/or the controller/processor 359). It should be understood that blocks indicated with dashed lines in FIG. 10 represent optional blocks.

At 1002, the UE receives an interference resource information message indicating resources allocated to one or more interfering UEs for transmission of reference signal beams. In some examples, the interference resource information message may be the message 806 including interference resource information described with reference to FIG. 8A. In some examples, the interference resource information message further indicates quasi-colocation information (QCL) associated with at least one receive beam for the UE, where the at least one receive beam enables reception of at least one of the reference signal beams.

At 1004, the UE measures the reference signal beams from the one or more interfering UEs based on the resources to obtain a plurality of reference signal beam measurements. For example, with reference to FIG. 8A, the first UE 714 at 816 may measure one or more uplink signal beams (e.g., reference signal beams, such as beamformed SRSs or DM-RS s) from one or more interfering UEs (e.g., the second UE 716 and/or the third UE 734). For example, the first UE 714 may measure the first uplink signal beam 808 through the ith uplink signal beam 810. In some aspects of the disclosure, the first UE 714 may measure the first uplink signal beam 808 through the ith uplink signal beam 810 based on the interference resource information in the message 806. The first UE 714 may further measure the first uplink signal beam 812 through the jth uplink signal beam 814. In some aspects of the disclosure, the first UE 714 may measure the first uplink signal beam 812 through the jth uplink signal beam 814 based on the interference resource information in the message 806.

Therefore, at 816, the first UE 714 may obtain one or more uplink signal beam measurements (e.g., reference signal beam measurements) from one or more interfering UEs. The uplink signal beam measurements may include beam strength measurements of one or more uplink signal beams, such as reference signal received power (RSRP) measurements and/or received signal strength indicator (RSSI) measurements.

At 1006, the UE transmits a report indicating a set of the reference signal beams from the one or more interfering UEs based on the plurality of reference signal beam measurements. For example, the report may be the report generated at 818 in FIG. 8A. In a first example, the set of the reference signal beams includes M strongest reference signal beams from each of the one or more interfering UEs. In a second example, the set of the reference signal beams includes N weakest reference signal beams from each of the one or more interfering UEs. In a third example, the set of the reference signal beams includes K strongest reference signal beams from the one or more interfering UEs. In a fourth example, the set of the reference signal beams includes L weakest reference signal beams from the one or more interfering UEs.

In some examples, the set of the reference signal beams includes a first subset of the reference signal beams, where each reference signal beam in the first subset has a first reference signal beam measurement that is greater than or equal to a threshold. In some examples, the set of the reference signal beams further includes a second subset of the reference signal beams, where each reference signal beam in the second subset has a second reference signal beam measurement that is less than the threshold.

In some aspects, the report is transmitted in at least one of a physical data channel or a physical control channel. In some aspects, the report is transmitted periodically, aperiodically, semi-persistently, or in response to a trigger.

At 1008, the UE receives information that enables identification of an interfering UE of the one or more interfering UEs based on a reference signal beam of the reference signal beams. For example, with reference to FIG. 8B, the UE 714 may receive the message 826 including information (also referred to as UE identity information) that enables the first UE 714 to identify an interfering UE in the first cell 710 (e.g., the second UE 716) or an interfering UE in the second cell 730 (e.g., the third UE 734) based on an uplink signal beam received from the interfering UE. In some examples, the UE identity information in the message 826 may include a list of resources used by interfering UEs for transmission of uplink signal beams and a UE identifier associated with each of the resources in the list.

At 1010, the UE detects the reference signal beam of the reference signal beams from the interfering UE of the one or more interfering UEs. For example, at 838 in FIG. 8B, the first UE 714 may detect the uplink signal beam 834 from the second UE 716 and/or the uplink signal beam 836 from the third UE 734. For example, the first UE 714 may detect an SRS or a DM-RS from an interfering UE (uplink signal beam 834 and/or the uplink signal beam 836).

At 1012, the UE determines an identity of the interfering UE based on the detected reference signal beam and the information. For example, at 840 in FIG. 8B, the first UE 714 may determine an identity of the interfering UE based on the detected reference signal beam and the UE identity information in the message 826. In some examples, when the first UE 714 detects a UL signal beam (e.g., a reference signal beam) from an interfering UE on a certain resource (e.g., a time-frequency resource), the first UE 714 may find the certain resource in the UE identity information and may determine the UE identifier corresponding to the certain resource in the UE identity information.

At 1014, the UE transmits a request message including at least one of a request that the interfering UE not transmit an uplink signal transmission, a request for the interfering UE to reduce a transmit power of the uplink signal transmission, or a request for the interfering UE to change a transmit beam for the uplink signal transmission. In some examples, the request message is transmitted to a base station or to the interfering UE. In some examples, the request message is transmitted to a base station with the identity of the interfering UE, or to the interfering UE using the identity of the interfering UE and a sidelink channel between the apparatus and the interfering UE. In some examples, the request message is transmitted in response to a trigger. In some examples, the trigger occurs when a strength of the reference signal beam exceeds a first threshold or when a signal-to-noise and interference ratio (SINR) at the apparatus is reduced by an amount that exceeds a second threshold. For example, with reference to FIG. 8B, the request message may be the first request message (Request_1) 842, the second request message (Request_2) 844, and/or the third request message (Request_3) 846.

Figure 11:
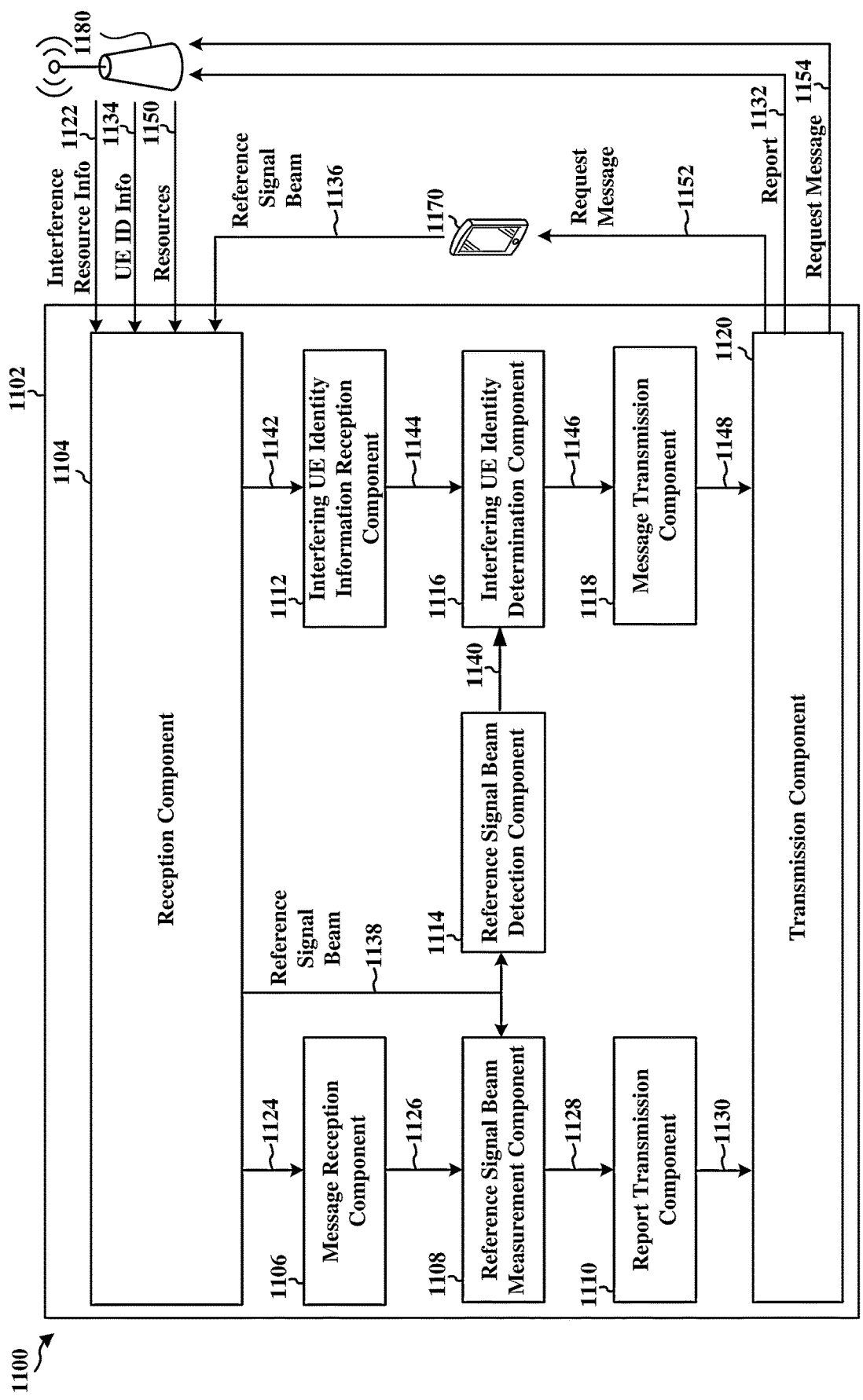
FIG. 11 is a conceptual data flow diagram illustrating the data flow between different means/components in an example apparatus.

FIG. 11 is a conceptual data flow diagram 1100 illustrating the data flow between different means/components in an example apparatus 1102. The apparatus may be a UE. The apparatus includes a reception component 1104 that receives downlink signals (e.g., downlink signal beams from a base station 1180), uplink signals (e.g., uplink signal beams, such as reference signal beams, from an interfering UE), and/or sidelink signals (e.g., sidelink signals from an interfering UE). In some examples, the reception component 1150 receives resources 1150 that mitigate inter-UE CLI.

The apparatus includes a message reception component 1106 that receives an interference resource information message indicating resources allocated to one or more interfering UEs for transmission of reference signal beams. For example, the apparatus may receive an interference resource information message 1122 from the base station 1180. The message reception component 1106 may receive a signal 1124 (e.g., via the reception component 1104) including the interference resource information message 1122.

The apparatus includes a reference signal beam measurement component 1108 that measures the reference signal beams from the one or more interfering UEs based on the resources to obtain a plurality of reference signal beam measurements. For example, the reference signal beam measurement component 1108 may receive a signal 1126 (e.g., via the message reception component 1106) that includes the resources the apparatus may use to obtain a plurality of reference signal beam measurements.

For example, the apparatus may use the resources (e.g., time-frequency resources) received via the signal 1126 to receive a reference signal beam 1136 from the UE 1170. The reference signal beam measurement component 1108 may receive the reference signal beam 1136 (e.g., via the reception component 1104) in a signal 1138. The reference signal beam measurement component 1108 may provide a signal 1128 that includes a plurality of reference signal beam measurements.

The apparatus includes a report transmission component 1110 that generates a report indicating a set of the reference signal beams from the one or more interfering UEs (e.g., UE 1170) based on the plurality of reference signal beam measurements and transmits the report to the base station 1180 via the transmission component 1120. For example, the report transmission component 1110 provides a signal 1130 including the report to the transmission component 1120. The transmission component 1120 may transmit a message 1132 including the report to the base station 1180.

The apparatus includes an interfering UE identity information reception component 1112 that receives information that enables identification of the interfering UE of the one or more interfering UEs based on the reference signal beam of the reference signal beams. For example, the apparatus may receive a message 1134 including information (also referred to as UE identity information) that enables the apparatus to identify an interfering UE (e.g., the UE 1170) based on a reference signal beam received from the interfering UE. The interfering UE identity information reception component 1112 may receive the UE identity information (e.g., via the reception component 1104) in a signal 1142.

The apparatus includes a reference signal beam detection component 1114 that detects a reference signal beam of the reference signal beams from an interfering UE of the one or more interfering UEs. For example, the reference signal beam detection component 1114 may receive the reference signal beam 1136 (e.g., via the reception component 1104) in the signal 1138 and may detect the reference signal beam 1136. The reference signal beam detection component 1114 may provide a signal 1140 indicating the detected reference signal beam.

The apparatus includes an interfering UE identity determination component 1116 that determines an identity of the interfering UE based on the detected reference signal beam and the information. For example, the interfering UE identity determination component 1116 may receive a signal 1144 from the interfering UE identity information reception component 1112 including the UE identity information, and may receive the signal 1140 indicating the detected reference signal beam. The interfering UE identity determination component 1116 may identify the interfering UE (e.g., the UE 1170) based on the UE identity information and the detected reference signal beam, and may provide a signal 1146 indicating an identity of the interfering UE.

The apparatus includes a message transmission component 1118 that transmits a request message including at least one of a request that the interfering UE not transmit an uplink signal transmission, a request for the interfering UE to reduce a transmit power of the uplink signal transmission, or a request for the interfering UE to change a transmit beam for the uplink signal transmission. For example, the message transmission component 1118 may provide a signal 1148 to the transmission component 1120 including the previously described request message. The transmission component 1120 may transmit a sidelink signal 1152 including the request message to the interfering UE (e.g., the UE 1170) and/or may transmit an uplink signal 1154 including the request message to the base station 1180.

The apparatus includes a transmission component 1120 that transmits uplink signals (e.g., uplink signal beams) and/or sidelink signals (e.g., sidelink signals to an interfering UE).

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
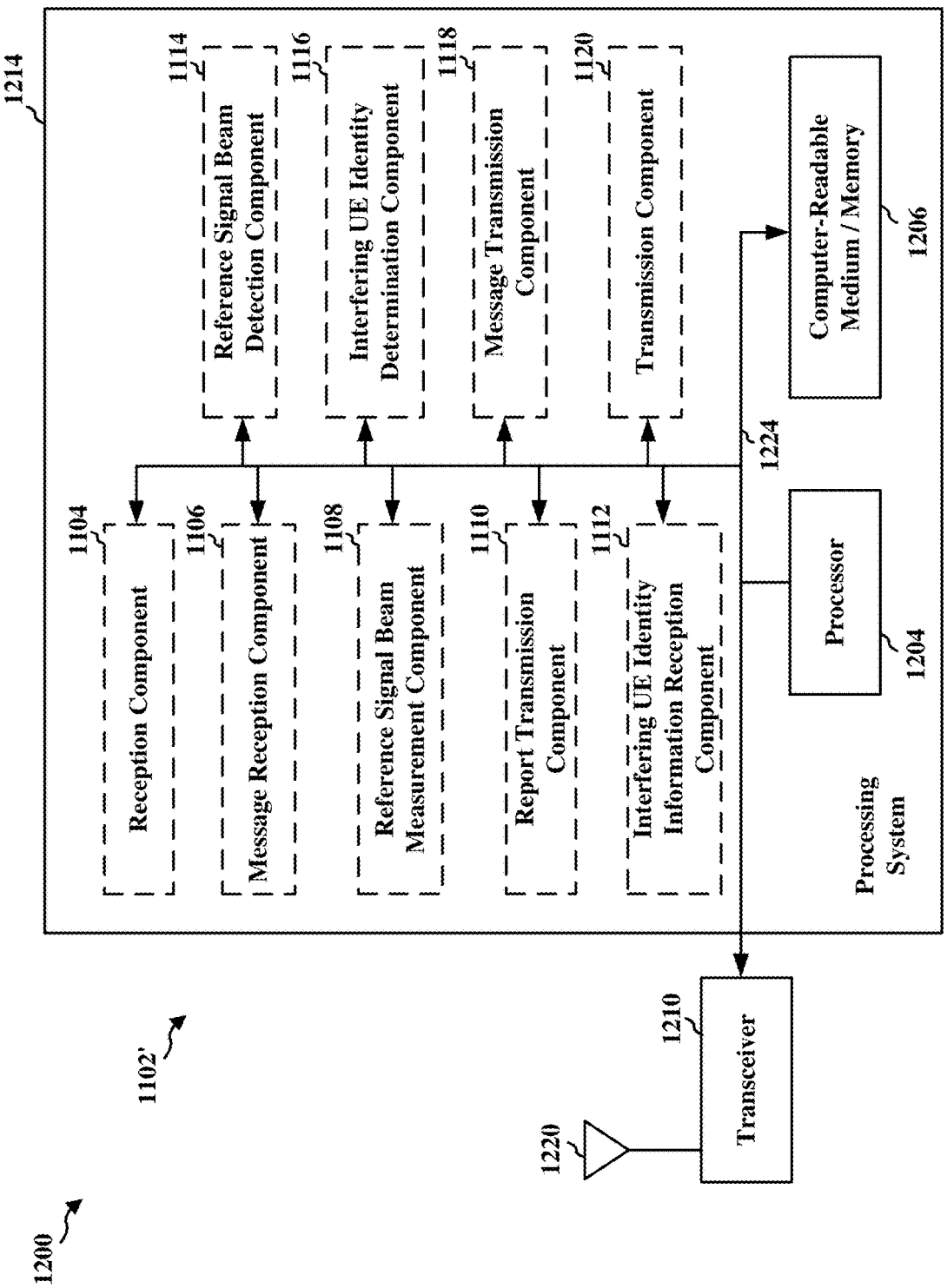
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, 1118, 1120, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1120, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116, 1118, 1120. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359. Alternatively, the processing system 1214 may be the entire UE (e.g., see 350 of FIG. 3).

In one configuration, the apparatus 1102/1102' for wireless communication includes means receiving an interference resource information message indicating resources allocated to one or more interfering UEs for transmission of reference signal beams, means for measuring the reference signal beams from the one or more interfering UEs based on the resources to obtain a plurality of reference signal beam measurements, means for transmitting a report indicating a set of the reference signal beams from the one or more interfering UEs based on the plurality of reference signal beam measurements, means for detecting a reference signal beam of the reference signal beams from an interfering UE of the one or more interfering UEs, means for transmitting a request message including at least one of a request that the interfering UE not transmit an uplink signal transmission, a request for the interfering UE to reduce a transmit power of the uplink signal transmission, or a request for the interfering UE to change a transmit beam for the uplink signal transmission, means for receiving information that enables identification of the interfering UE of the one or more interfering UEs based on the reference signal beam of the reference signal beams, means for determining an identity of the interfering UE based on the detected reference signal beam and the information, wherein the request message is transmitted to a base station with the identity of the interfering UE, or to the interfering UE using the identity of the interfering UE and a sidelink channel between the apparatus and the interfering UE.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
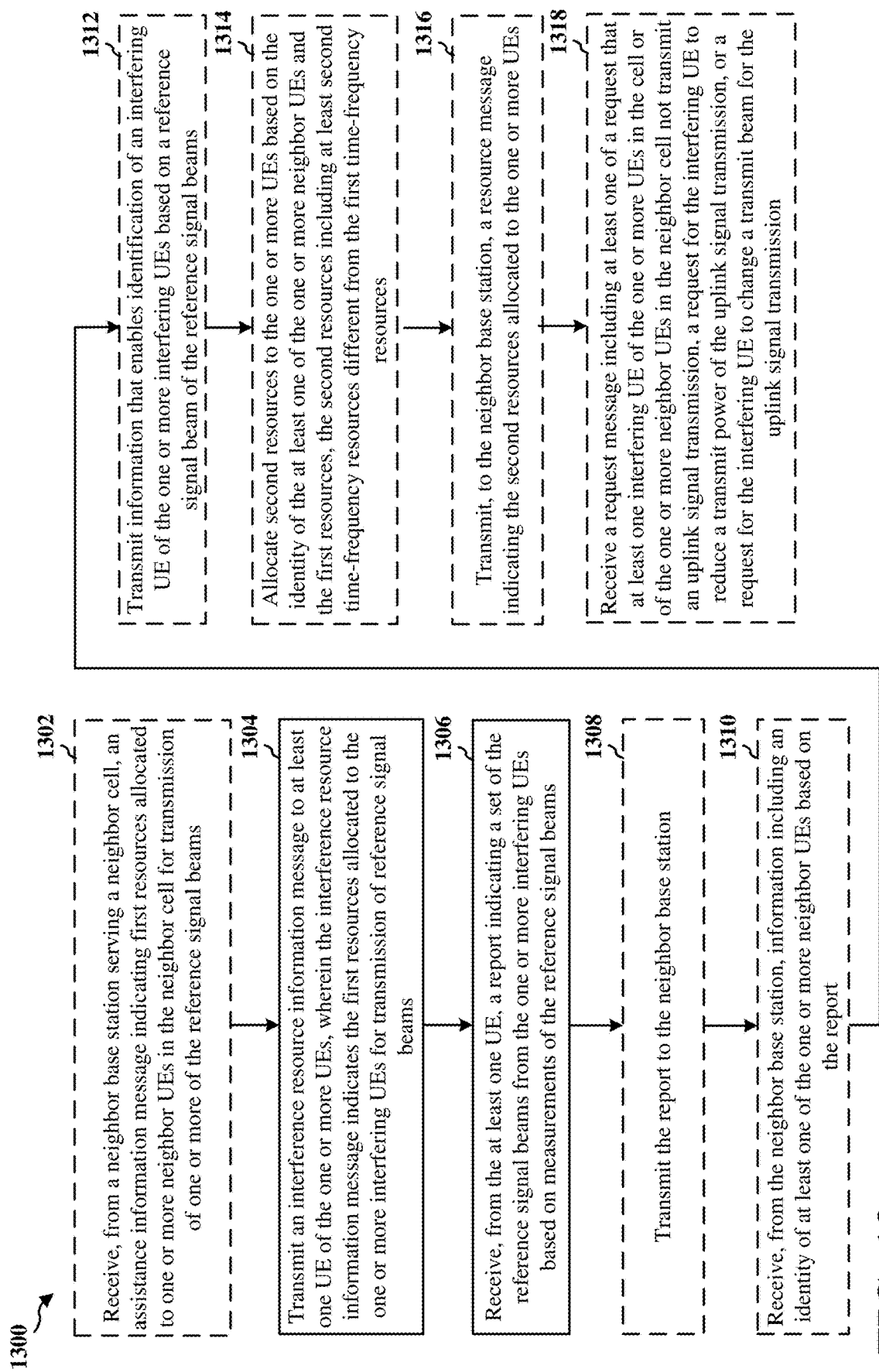
FIG. 13 is a flowchart of a method of wireless communication.

FIG. 13 is a flowchart 1300 of a method of wireless communication. The method may be performed by a base station (e.g., the base station 102/180, 712; the apparatus 1402/1402'; the processing system 1514, which may include the memory 376 and which may be the entire base station 102/180, 712 or a component of the base station 102/180, 712, such as the TX processor 316, the RX processor 370, and/or the controller/processor 375). It should be understood that blocks indicated with dashed lines in FIG. 13 represent optional blocks.

At 1302, the base station receives, from a neighbor base station serving a neighbor cell, an assistance information message indicating first resources allocated to one or more neighbor UEs in the neighbor cell for transmission of one or more of the reference signal beams. For example, with reference to FIG. 8A, the first base station 712 may receive a message 804 (also referred to as an assistance information message) from the second base station 732 including the assistance information. For example, the assistance information may include first resource information indicating first resources allocated by the second base station 732 to one or more UEs in the second cell 730 (e.g., the third UE 734). For example, the first resources may include first time-frequency resources for transmission of beamformed uplink signals (also referred to as uplink signal beams).

At 1304, the base station transmits an interference resource information message to at least one UE of the one or more UEs, wherein the interference resource information message indicates the first resources allocated to the one or more interfering UEs for transmission of reference signal beams. In some examples, the interference resource information message may be the message 806 including interference resource information described with reference to FIG. 8A. In some examples, the interference resource information message further indicates quasi-colocation information (QCL) associated with at least one receive beam for the at least one UE, where the at least one receive beam enables reception of at least one of the reference signal beams.

At 1306, the base station receives, from the at least one UE, a report indicating a set of the reference signal beams from the one or more interfering UEs based on measurements of the reference signal beams. For example, the report may be the report generated by the first UE 714 at 818 in FIG. 8A. In a first example, the set of the reference signal beams includes M strongest reference signal beams from each of the one or more interfering UEs. In a second example, the set of the reference signal beams includes N weakest reference signal beams from each of the one or more interfering UEs. In a third example, the set of the reference signal beams includes K strongest reference signal beams from the one or more interfering UEs. In a fourth example, the set of the reference signal beams includes L weakest reference signal beams from the one or more interfering UEs.

In some examples, the set of the reference signal beams includes a first subset of the reference signal beams, where each reference signal beam in the first subset has a first reference signal beam measurement that is greater than or equal to a threshold. In some examples, the set of the reference signal beams further includes a second subset of the reference signal beams, where each reference signal beam in the second subset has a second reference signal beam measurement that is less than the threshold.

In some aspects, the report is received in at least one of a physical data channel or a physical control channel. In some aspects, the report is received periodically, aperiodically, semi-persistently, or in response to a trigger at the at least one UE.

At 1308, the base station transmits the report to the neighbor base station. For example, with reference to FIG. 8B, the first base station 712 may transmit a message 822 to the second base station 732 including the report received in the message 820.

At 1310, the base station receives, from the neighbor base station, information including an identity of at least one of the one or more neighbor UEs based on the report. For example, with reference to FIG. 8B, the first base station 712 may receive a message 824 from the second base station 732 including identity information of at least one UE (also referred to as UE identity information) in the second cell 730 based on the report. In some examples, the message 824 may include identity information for one or more of the reference signal beams in the set of reference signal beams included in the report. The identity information may include an index number associated with a UE in the second cell 730, a unique identifier associated with the UE in the second cell 730, and/or other suitable value associated with a UE in the second cell 730.

At 1312, the base station transmits information that enables identification of an interfering UE of the one or more interfering UEs based on a reference signal beam of the reference signal beams. For example, with reference to FIG. 8B, the base station 712 may transmit the message 826 including information (also referred to as UE identity information) that enables the first UE 714 to identify an interfering UE in the first cell 710 (e.g., the second UE 716) or an interfering UE in the second cell 730 (e.g., the third UE 734) based on an uplink signal beam received from the interfering UE. In some examples, the UE identity information in the message 826 may include a list of resources used by interfering UEs for transmission of uplink signal beams and a UE identifier associated with each of the resources in the list.

At 1314, the base station allocates second resources to the one or more UEs based on the identity of the at least one of the one or more neighbor UEs and the first resources, the second resources including at least second time-frequency resources different from the first time-frequency resources. For example, with reference to FIG. 8B, the first base station 712 may transmit a message 828 that allocates resources to one or more UEs in the first cell 710 (e.g., the first UE 714) based at least on the report in the message 820. In some examples, the resources in the message 828 may be based on the identity of an interfering UE and time-frequency resources allocated to the interfering UE as indicated in the report in the message 820. For example, the resources in the message 828 may include time-frequency resources different from time-frequency resources allocated to the interfering UE to avoid or mitigate cross-link interference at the first UE 714. In one example scenario, the resources in the message 828 allocated to the first UE 714 may include time-frequency resources different from time-frequency resources allocated to the second UE 716 and the third UE 734.

At 1316, the base station transmits, to the neighbor base station, a resource message indicating the second resources allocated to the one or more UEs. For example, with reference to FIG. 8B, the first base station 712 may transmit a message 830 to the second base station 732 that indicates the resources allocated to one or more UEs in the first cell 710 (e.g., the first UE 714). In some examples, the second base station 732 may consider the resources in the message 830 when allocating resources to one or more UEs in the second cell 730 (e.g., the third UE 734). For example, the second base station 732 may transmit a message 832 that allocates resources to the third UE 734, where the resources in the message 832 include different time-frequency resources relative to the resources in the message 830 to avoid or mitigate interference from the third UE 734 to the first UE 714.

At 1318, the base station receives a request message including at least one of a request that at least one interfering UE of the one or more UEs in the cell or of the one or more neighbor UEs in the neighbor cell not transmit an uplink signal transmission, a request for the interfering UE to reduce a transmit power of the uplink signal transmission, or a request for the interfering UE to change a transmit beam for the uplink signal transmission. For example, with reference to FIG. 8B, the request message may be the first request message (Request_1) 842.

Figure 14:
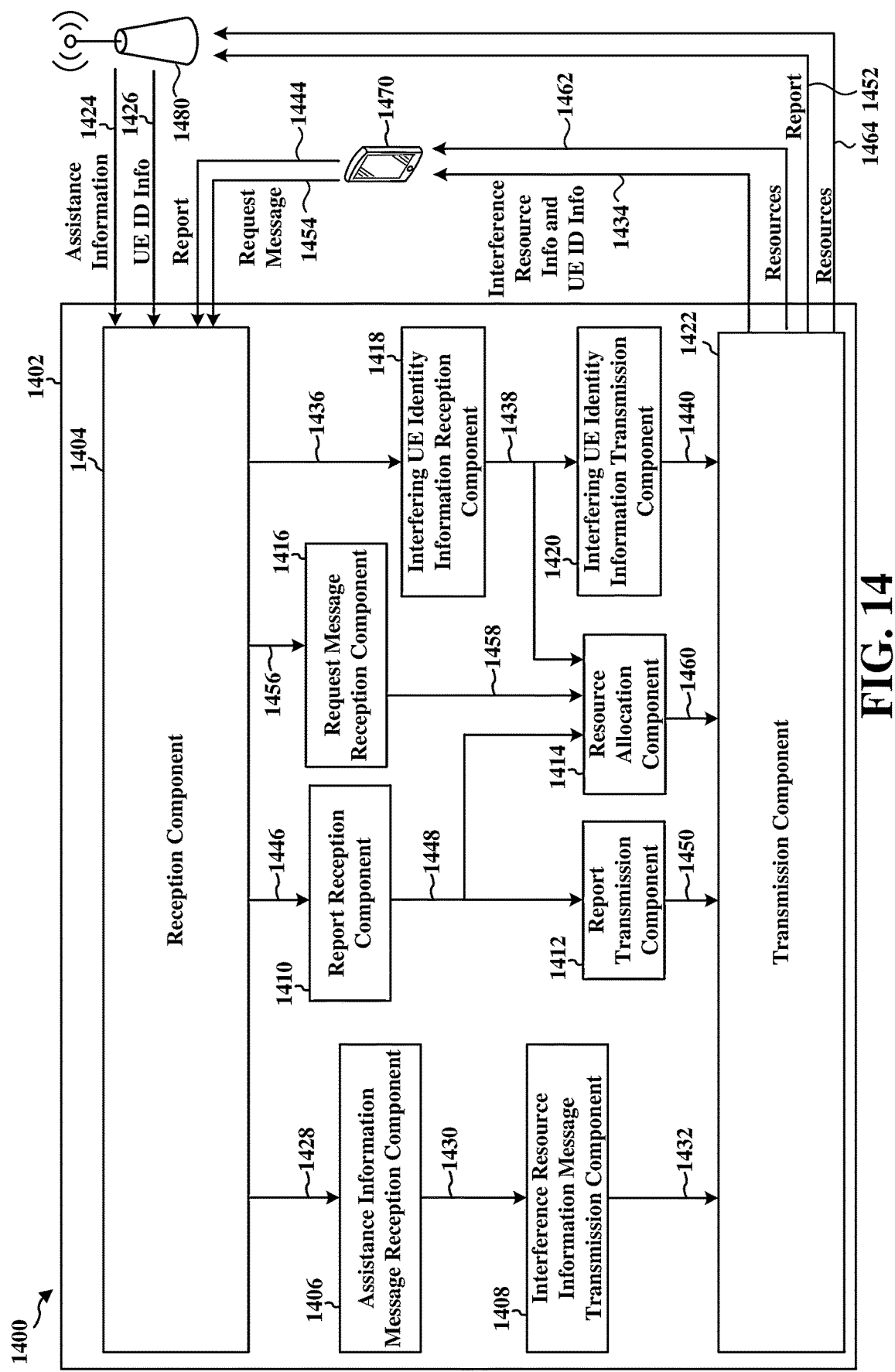
FIG. 14 is a conceptual data flow diagram illustrating the data flow between different means/components in an example apparatus.

FIG. 14 is a conceptual data flow diagram 1400 illustrating the data flow between different means/components in an example apparatus 1402. The apparatus may be a base station.

The apparatus includes a reception component 1404 that receives uplink signals (e.g., uplink signal beams from a UE), such as the uplink signals 1444, 1454 from the UE 1470, and communications from one or more base stations, such as messages 1424, 1426 from the base station 1480. In some examples, the UE 1470 may be the first UE 714 described herein, and the base station 1480 may be the second base station 732.

The apparatus includes an assistance information message reception component 1406 receives, from a neighbor base station serving a neighbor cell, an assistance information message indicating first resources allocated to one or more neighbor UEs in the neighbor cell for transmission of one or more of the reference signal beams, wherein the interference resource information message indicates the first resources. For example, the apparatus may receive an assistance information message 1424 at the reception component 1404 from the base station 1480. The assistance information message reception component 1406 may receive a signal 1428 (e.g., via the reception component 1404) including the assistance information message 1424. In some examples, the base station 1480 may be a neighbor base station with respect to the apparatus.

The apparatus includes an interference resource information message transmission component 1408 that transmits an interference resource information message to at least one UE of the one or more UEs, wherein the interference resource information message indicates the first resources allocated to one or more interfering UEs for transmission of reference signal beams. For example, the interference resource information message transmission component 1408 receives the first resources via a signal 1430 and provides a signal 1432 including interference resource information to the transmission component 1422. The transmission component 1422 may transmit a message 1434 including the interference resource information to the UE 1470.

The apparatus includes a report reception component 1410 that receives, from the at least one UE (e.g., the UE 1470), a report indicating a set of the reference signal beams from the one or more interfering UEs based on measurements of the reference signal beams. For example, the apparatus may receive the message 1444 including the report from the UE 1470. The report reception component 1410 may receive a signal 1446 (e.g., via the reception component 1404) that includes the report.

The apparatus includes a report transmission component 1412 that transmits the report to the neighbor base station. For example, the report transmission component 1412 may receive a signal 1448 including the report from the report reception component 1410 and may provide the report to the transmission component 1422 via a signal 1450. The transmission component 1422 may transmit a message 1452 including the report to the base station 1480.

The apparatus includes a resource allocation component 1414 that allocates second resources to the one or more UEs based on the identity of the at least one of the one or more neighbor UEs and the first resources, the second resources including at least second time-frequency resources different from the first time-frequency resources. For example, the identity of the at least one of the one or more neighbor UEs may be received via the signal 1438 and the first resources may be indicated in the report received via the signal 1448. The resource allocation component 1414 further transmits, to the neighbor base station, a resource message indicating the second resources allocated to the one or more UEs. For example, the resource allocation component 1414 may provide a signal 1460 including the second resources to the transmission component 1422. The transmission component 1422 may transmit a message 1462 including the second resources to the UE 1470 and/or a message 1464 including the second resources to the base station 1480.

The apparatus includes a request message reception component 1416 that receives a request message including at least one of a request that at least one interfering UE of the one or more UEs in the cell or of the one or more neighbor UEs in the neighbor cell not transmit an uplink signal transmission, a request for the interfering UE to reduce a transmit power of the uplink signal transmission, or a request for the interfering UE to change a transmit beam for the uplink signal transmission. For example, the apparatus may receive the request message 1454 from the UE 1470 at the reception component 1404. The request message reception component 1416 may receive a signal 1456 (e.g., via the reception component 1404) that includes the request message 1454. The request message reception component 1416 may provide a signal 1458 to the resource allocation component 1414 including the request message 1454.

The apparatus includes an interfering UE identity information reception component 1418 that receives, from the neighbor base station, information including an identity of at least one of the one or more neighbor UEs based on the report. For example, the apparatus may receive a message 1426 including UE identification information at the reception component 1404 from the base station 1480. The interfering UE identity information reception component 1418 may receive a signal 1436 (e.g., via the reception component 1404) including the UE identification information.

The apparatus includes an interfering UE identity information transmission component 1420 that transmits information that enables identification of an interfering UE of the one or more interfering UEs based on a reference signal beam of the reference signal beams. For example, the interfering UE identity information transmission component 1420 may receive a signal 1438 including the UE identification information and may provide the UE identification information to the transmission component 1422 via a signal 1440. The transmission component 1422 may transmit the message 1434 including the UE identification information to the base station 1480.

The apparatus includes a transmission component 1422 that transmits downlink signals (e.g., downlink signal beams) to the UE 1470, and communications to one or more base stations, such as the messages 1452, 1464 to the base station 1480.

The apparatus may include additional components that perform each of the blocks of the algorithm in the aforementioned flowchart of FIG. 13. As such, each block in the aforementioned flowcharts of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 15:
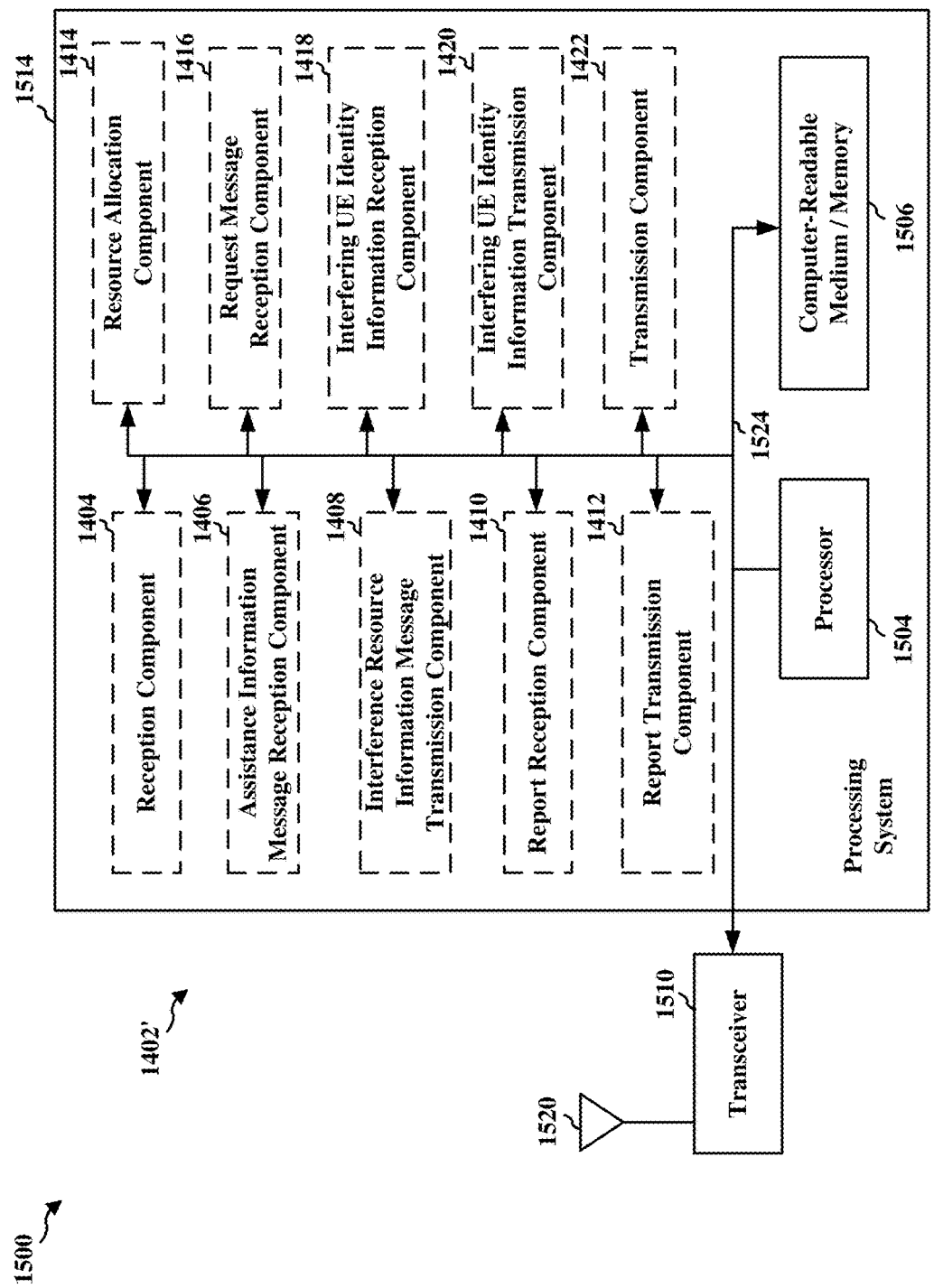
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1404, 1406, 1408, 1410, 1412, 1414, 1416, 1418, 1420, 1422, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1404. In addition, the transceiver 1510 receives information from the processing system 1514, specifically the transmission component 1422, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1404, 1406, 1408, 1410, 1412, 1414, 1416, 1418, 1420, 1422. The components may be software components running in the processor 1504, resident/stored in the computer readable medium/memory 1506, one or more hardware components coupled to the processor 1504, or some combination thereof. The processing system 1514 may be a component of the base station 310 and may include the memory 376 and/or at least one of the TX processor 316, the RX processor 370, and the controller/processor 375. Alternatively, the processing system 1514 may be the entire base station (e.g., see 310 of FIG. 3).

In one configuration, the apparatus 1402/1402' for wireless communication includes means for transmitting an interference resource information message to at least one UE of the one or more UEs, wherein the interference resource information message indicates first resources allocated to one or more interfering user equipments (UEs) for transmission of reference signal beams; means for receiving, from the at least one UE, a report indicating a set of the reference signal beams from the one or more interfering UEs based on measurements of the reference signal beams, means for receiving, from a neighbor base station serving a neighbor cell, an assistance information message indicating the first resources allocated to one or more neighbor UEs in the neighbor cell for transmission of one or more of the reference signal beams, wherein the interference resource information message indicates the first resources, means for transmitting the report to the neighbor base station, means for receiving, from the neighbor base station, information including an identity of at least one of the one or more neighbor UEs based on the report, means for allocating second resources to the one or more UEs based on the identity of the at least one of the one or more neighbor UEs and the first resources, the second resources including at least second time-frequency resources different from the first time-frequency resources, means for transmitting, to the neighbor base station, a third message indicating the second resources allocated to the one or more UEs, means for transmitting information that enables identification of an interfering UE of the one or more interfering UEs based on a reference signal beam of the reference signal beams, means for receiving a request message including at least one of a request that at least one interfering UE of the one or more UEs in the cell or the one or more neighbor UEs in the neighbor cell not transmit an uplink signal transmission, a request for the interfering UE to reduce a transmit power of the uplink signal transmission, or a request for the interfering UE to change a transmit beam for the uplink signal transmission.

The aforementioned means may be one or more of the aforementioned components of the apparatus 1402 and/or the processing system 1514 of the apparatus 1402' configured to perform the functions recited by the aforementioned means. As described supra, the processing system 1514 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Therefore, the aspects described herein may enable a UE (e.g., the first UE 714) in a cell to proactively measure uplink signal beams from interfering UEs in the cell or in neighboring cells and to report measurements of the uplink signal beams to a base station serving the cell. In some examples, the base station serving the cell may use the report to identify the interfering UEs and/or the beams of the interfering UEs. For example, the report may indicate one or more of the strongest reference signal beams from each of the interfering UEs on certain resources. In some examples, the base station may avoid scheduling the UE (e.g., the first UE 714) with the resources (e.g., time-frequency resources) on which the strongest reference signal beams were measured to mitigate cross-link interference with the interfering UEs. In other examples, the UE (e.g., the first UE 714) may identify an interfering UE and may transmit a request message to the interfering UE (e.g., directly to the interfering UE over a sidelink channel) or the base station serving the cell to mitigate cross-link interference. For example, the UE (e.g., the first UE 714) may request the interfering UE to not transmit an uplink signal transmission, to reduce a transmit power of the uplink signal transmission, and/or to change a transmit beam for the uplink signal transmission.

The following provides an overview of aspects of the present disclosure:

Aspect 1: An apparatus for wireless communication, comprising: a memory; and at least one processor coupled to the memory and configured to: receive an interference resource information message indicating resources allocated to one or more interfering user equipments (UEs) for transmission of reference signal beams; measure the reference signal beams from the one or more interfering UEs based on the resources to obtain a plurality of reference signal beam measurements; and transmit a report indicating a set of the reference signal beams from the one or more interfering UEs based on the plurality of reference signal beam measurements.

Aspect 2: The apparatus of aspect 1, wherein the set of the reference signal beams includes M strongest reference signal beams from each of the one or more interfering UEs.

Aspect 3: The apparatus of aspect 1 or 2, wherein the set of the reference signal beams includes N weakest reference signal beams from each of the one or more interfering UEs.

Aspect 4: The apparatus of any of aspects 1 through 3, wherein the set of the reference signal beams includes K strongest reference signal beams from the one or more interfering UEs.

Aspect 5: The apparatus of any of aspects 1 through 4, wherein the set of the reference signal beams includes L weakest reference signal beams from the one or more interfering UEs.

Aspect 6: The apparatus of any of aspects 1 through 5, wherein the set of the reference signal beams includes a first subset of the reference signal beams, wherein each reference signal beam in the first subset has a first reference signal beam measurement that is greater than or equal to a threshold.

Aspect 7: The apparatus of any of aspects 1 through 6, wherein the set of the reference signal beams further includes a second subset of the reference signal beams, wherein each reference signal beam in the second subset has a second reference signal beam measurement that is less than the threshold.

Aspect 8: The apparatus of any of aspects 1 through 7, wherein the interference resource information message further indicates quasi-colocation information (QCL) associated with at least one receive beam for the apparatus, wherein the at least one receive beam enables reception of at least one of the reference signal beams.

Aspect 9: The apparatus of any of aspects 1 through 8, wherein the report is transmitted in at least one of a physical data channel or a physical control channel.

Aspect 10: The apparatus of any of aspects 1 through 9, wherein the report is transmitted periodically, aperiodically, semi-persistently, or in response to a trigger.

Aspect 11: The apparatus of any of aspects 1 through 10, wherein the at least one processor is further configured to: detect a reference signal beam of the reference signal beams from an interfering UE of the one or more interfering UEs; and transmit a request message including at least one of a request that the interfering UE not transmit an uplink signal transmission, a request for the interfering UE to reduce a transmit power of the uplink signal transmission, or a request for the interfering UE to change a transmit beam for the uplink signal transmission.

Aspect 12: The apparatus of any of aspects 1 through 11, wherein the request message is transmitted to a base station or to the interfering UE.

Aspect 13: The apparatus of any of aspects 1 through 12, wherein the at least one processor is further configured to: receive information that enables identification of the interfering UE of the one or more interfering UEs based on the reference signal beam of the reference signal beams; and determine an identity of the interfering UE based on the detected reference signal beam and the information, wherein the request message is transmitted to a base station with the identity of the interfering UE, or to the interfering UE using the identity of the interfering UE and a sidelink channel between the apparatus and the interfering UE.

Aspect 14: The apparatus of any of aspects 1 through 13, wherein the request message is transmitted in response to a trigger.

Aspect 15: The apparatus of any of aspects 1 through 14, wherein the trigger occurs when a strength of the reference signal beam exceeds a first threshold or when a signal-to-noise and interference ratio (SINR) at the apparatus is reduced by an amount that exceeds a second threshold.

Aspect 16: An apparatus for wireless communication, wherein the apparatus serves a cell including one or more user equipments (UEs), comprising: a memory; and at least one processor coupled to the memory and configured to: transmit an interference resource information message to at least one UE of the one or more UEs, wherein the interference resource information message indicates first resources allocated to one or more interfering user equipments (UEs) for transmission of reference signal beams; and receive, from the at least one UE, a report indicating a set of the reference signal beams from the one or more interfering UEs based on measurements of the reference signal beams.

Aspect 17: The apparatus of aspect 16, wherein the set of the reference signal beams includes M strongest reference signal beams from each of the one or more interfering UEs.

Aspect 18: The apparatus of aspect 16 or 17, wherein the set of the reference signal beams includes N weakest reference signal beams from each of the one or more interfering UEs.

Aspect 19: The apparatus of any of aspects 16 through 18, wherein the set of the reference signal beams includes K strongest reference signal beams from the one or more interfering UEs.

Aspect 20: The apparatus of any of aspects 16 through 19, wherein the set of the reference signal beams includes L weakest reference signal beams from the one or more interfering UEs.

Aspect 21: The apparatus of any of aspects 16 through 20, wherein the set of the reference signal beams includes a first subset of the reference signal beams, wherein each reference signal beam in the first subset has a first reference signal beam measurement that is greater than or equal to a threshold.

Aspect 22: The apparatus of any of aspects 16 through 21, wherein the set of the reference signal beams further includes a second subset of the reference signal beams, wherein each reference signal beam in the second subset has a second reference signal beam measurement that is less than the threshold.

Aspect 23: The apparatus of any of aspects 16 through 22, wherein the interference resource information message further indicates quasi-colocation information (QCL) associated with at least one receive beam for the at least one UE, wherein the at least one receive beam enables reception of at least one of the reference signal beams.

Aspect 24: The apparatus of any of aspects 16 through 23, wherein the at least one processor is further configured to: receive, from a neighbor base station serving a neighbor cell, an assistance information message indicating the first resources allocated to one or more neighbor UEs in the neighbor cell for transmission of one or more of the reference signal beams, wherein the interference resource information message indicates the first resources.

Aspect 25: The apparatus of any of aspects 16 through 24, wherein the at least one processor is further configured to: transmit the report to the neighbor base station; and receive, from the neighbor base station, information including an identity of at least one of the one or more neighbor UEs based on the report.

Aspect 26: The apparatus of any of aspects 16 through 25, wherein the first resources include first time-frequency resources, wherein the at least one processor is further configured to: allocate second resources to the one or more UEs based on the identity of the at least one of the one or more neighbor UEs and the first resources, the second resources including at least second time-frequency resources different from the first time-frequency resources.

Aspect 27: The apparatus of any of aspects 16 through 26, wherein the at least one processor is further configured to: transmit, to the neighbor base station, a resource message indicating the second resources allocated to the one or more UEs.

Aspect 28: The apparatus of any of aspects 16 through 27, wherein the at least one processor is further configured to: transmit information that enables identification of an interfering UE of the one or more interfering UEs based on a reference signal beam of the reference signal beams.

Aspect 29: The apparatus of any of aspects 16 through 28, wherein the at least one processor is further configured to: receive a request message including at least one of a request that at least one interfering UE of the one or more UEs in the cell or of the one or more neighbor UEs in the neighbor cell not transmit an uplink signal transmission, a request for the interfering UE to reduce a transmit power of the uplink signal transmission, or a request for the interfering UE to change a transmit beam for the uplink signal transmission.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C.

Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication, comprising:
   a memory; and
   at least one processor coupled to the memory and configured to:
      receive an interference resource information message indicating resources allocated to one or more interfering user equipments (UEs) for transmission of reference signal beams;
      measure the reference signal beams from the one or more interfering UEs based on the resources to obtain a plurality of reference signal beam measurements; and
      transmit a report indicating a set of the reference signal beams from the one or more interfering UEs based on the plurality of reference signal beam measurements; and
      transmit a request message to request mitigation of cross-link interference with at least one of the one or more interfering UEs.

2. The apparatus of claim 1, wherein the set of the reference signal beams includes M strongest reference signal beams from each of the one or more interfering UEs.

3. The apparatus of claim 1, wherein the set of the reference signal beams includes N weakest reference signal beams from each of the one or more interfering UEs.

4. The apparatus of claim 1, wherein the set of the reference signal beams includes K strongest reference signal beams from the one or more interfering UEs.

5. The apparatus of claim 1, wherein the set of the reference signal beams includes L weakest reference signal beams from the one or more interfering UEs.

6. The apparatus of claim 1, wherein the set of the reference signal beams includes a first subset of the reference signal beams, wherein each reference signal beam in the first subset has a first reference signal beam measurement that is greater than or equal to a threshold.

7. The apparatus of claim 6, wherein the set of the reference signal beams further includes a second subset of the reference signal beams, wherein each reference signal beam in the second subset has a second reference signal beam measurement that is less than the threshold.

8. The apparatus of claim 1, wherein the interference resource information message further indicates quasi-colocation information (QCL) associated with at least one receive beam for the apparatus, wherein the at least one receive beam enables reception of at least one of the reference signal beams.

9. The apparatus of claim 1, wherein the report is transmitted in at least one of a physical data channel or a physical control channel.

10. The apparatus of claim 9, wherein the report is transmitted periodically, aperiodically, semi-persistently, or in response to a trigger.

11. The apparatus of claim 1, wherein the at least one processor is further configured to:
   detect a reference signal beam of the reference signal beams from the at least one interfering UE of the one or more interfering UEs; and
   transmit the request message including to include at least one of a request that the the at least one interfering UE not transmit an uplink signal transmission, a request for the the at least one interfering UE to reduce a transmit power of the uplink signal transmission, or a request for the at least one interfering UE to change a transmit beam for the uplink signal transmission.

12. The apparatus of claim 11, wherein the request message is transmitted to a base station or to the at least one interfering UE.

13. The apparatus of claim 11, wherein the at least one processor is further configured to:
   receive information that enables identification of the at least one interfering UE of the one or more interfering UEs based on the reference signal beam of the reference signal beams; and
   determine an identity of the at least one interfering UE based on the detected reference signal beam and the information,
   wherein the request message is transmitted to a base station with the identity of the at least one interfering UE, or to the at least one interfering UE using the identity of the interfering UE and a sidelink channel between the apparatus and the interfering UE.

14. The apparatus of claim 11, wherein the request message is transmitted in response to a trigger.

15. The apparatus of claim 14, wherein the trigger occurs when a strength of the reference signal beam exceeds a first threshold or when a signal-to-noise and interference ratio (SINR) at the apparatus is reduced by an amount that exceeds a second threshold.

16. A method of wireless communication, comprising:
   receiving an interference resource information message indicating resources allocated to one or more interfering user equipments (UEs) for transmission of reference signal beams;
   measuring the reference signal beams from the one or more interfering UEs based on the resources to obtain a plurality of reference signal beam measurements; and
   transmitting a report indicating a set of the reference signal beams from the one or more interfering UEs based on the plurality of reference signal beam measurements; and
   transmitting a request message to request mitigation of cross-link interference with at least one of the one or more interfering UEs.

17. An apparatus for wireless communication, wherein the apparatus serves a first cell including one or more user equipments (UEs), comprising:
   a memory; and
   at least one processor coupled to the memory and configured to:
      receive, from a neighbor base station serving a second cell, an assistance information message indicating first resources allocated to one or more neighbor user equipments (UEs) of the second cell for transmission of one or more of the reference signal beams, wherein the interference resource information message indicates the first resources;

transmit an interference resource information message to at least one UE of the one or more UEs of the first cell, wherein the interference resource information message indicates the first resources allocated to one or more interfering UEs of the second cell for transmission of reference signal beams; and receive, from the at least one UE of the first cell, a report indicating a set of the reference signal beams from the one or more interfering UEs of the second cell based on measurements of the reference signal beams.

18. The apparatus of claim 17, wherein the set of the reference signal beams includes M strongest reference signal beams from each of the one or more interfering UEs.

19. The apparatus of claim 17, wherein the set of the reference signal beams includes N weakest reference signal beams from each of the one or more interfering UEs.

20. The apparatus of claim 17, wherein the set of the reference signal beams includes K strongest reference signal beams from the one or more interfering UEs.

21. The apparatus of claim 17, wherein the set of the reference signal beams includes L weakest reference signal beams from the one or more interfering UEs.

22. The apparatus of claim 17, wherein the set of the reference signal beams includes a first subset of the reference signal beams, wherein each reference signal beam in the first subset has a first reference signal beam measurement that is greater than or equal to a threshold.

23. The apparatus of claim 22, wherein the set of the reference signal beams further includes a second subset of the reference signal beams, wherein each reference signal beam in the second subset has a second reference signal beam measurement that is less than the threshold.

24. The apparatus of claim 17, wherein the at least one processor is further configured to:

transmit the report to the neighbor base station; and receive, from the neighbor base station, information including an identity of at least one of the one or more neighbor UEs of the second cell based on the report.

25. The apparatus of claim 24, wherein the first resources include first time-frequency resources, wherein the at least one processor is further configured to:

allocate second resources to the one or more UEs of the first cell based on the identity of the at least one of the one or more neighbor UEs of the second cell and the first resources, the second resources including at least second time-frequency resources different from the first time-frequency resources.

26. The apparatus of claim 25, wherein the at least one processor is further configured to:

transmit, to the neighbor base station, a resource message indicating the second resources allocated to the one or more UEs of the first cell.

27. The apparatus of claim 17, wherein the at least one processor is further configured to:

transmit information that enables identification of an interfering UE of the one or more interfering UEs based on a reference signal beam of the reference signal beams.

28. The apparatus of claim 17, wherein the at least one processor is further configured to:

receive a request message including at least one of a request that at least one interfering UE of the one or more UEs in the first cell or of the one or more neighbor UEs in the second cell not transmit an uplink signal transmission, a request for the interfering UE to reduce a transmit power of the uplink signal transmission, or a request for the interfering UE to change a transmit beam for the uplink signal transmission.

29. A method of wireless communication for a base station, wherein the base station serves a first cell including one or more user equipments (UEs), comprising:

receiving, from a neighbor base station serving a second cell, an assistance information message indicating first resources allocated to one or more neighbor UEs in the second cell for transmission of one or more of the reference signal beams, wherein the interference resource information message indicates the first resources;

transmitting an interference resource information message to at least one UE of the one or more UEs of the first cell, wherein the interference resource information message indicates resources allocated to one or more interfering UEs for transmission of reference signal beams; and receiving, from the at least one UE, a report indicating a set of the reference signal beams from the one or more interfering UEs based on measurements of the reference signal beams.

* * * * *

UNITED STATES PATENT AND TRADEMARK OFFICE
CERTIFICATE OF CORRECTION

PATENT NO. : 11,997,522 B2  
APPLICATION NO. : 17/456354  
DATED : May 28, 2024  
INVENTOR(S) : Qian Zhang et al.

Page 1 of 1

It is certified that error appears in the above-identified patent and that said Letters Patent is hereby corrected as shown below:

In the Specification

Column 8, Line 11: the equation "$2^{\mu} * 15$ kKz" is replaced with "$2^{\mu} * 15$ kHz".

Signed and Sealed this  
Tenth Day of December, 2024

Katherine Kelly Vidal  
*Director of the United States Patent and Trademark Office*